US012768947B2

(12) United States Patent
Eschbaumer et al.

(10) Patent No.: US 12,768,947 B2
(45) Date of Patent: Oct. 20, 2026

(54) SYSTEMS, DEVICES, AND METHODS FOR RADAR DETECTION

(71) Applicant: Infineon Technologies AG, Neubiberg (DE)

(72) Inventors: Maximilian Eschbaumer, Munich (DE); Simon Achatz, Munich (DE)

(73) Assignee: Infineon Technologies AG, Neubiberg (DE)

( * ) Notice: Subject to any disclaimer, the term of this patent is extended or adjusted under 35 U.S.C. 154(b) by 1181 days.

(21) Appl. No.: 17/720,487

(22) Filed: Apr. 14, 2022

(65) Prior Publication Data

US 2022/0342039 A1 Oct. 27, 2022

(30) Foreign Application Priority Data

Apr. 21, 2021 (DE) ........................ 102021110060.7

(51) Int. Cl.

| | |
|---|---|
| ***G01S 7/41*** | (2006.01) |
| ***G01S 7/35*** | (2006.01) |
| ***G01S 13/06*** | (2006.01) |
| ***G01S 13/42*** | (2006.01) |
| ***G01S 13/58*** | (2006.01) |
| *G01S 13/931* | (2020.01) |

(52) U.S. Cl.

CPC .............. *G01S 7/417* (2013.01); *G01S 7/356* (2021.05); *G01S 13/06* (2013.01); *G01S 13/42* (2013.01); *G01S 13/584* (2013.01); *G01S 13/931* (2013.01)

(58) Field of Classification Search

CPC .......... G01S 7/417; G01S 7/356; G01S 13/06; G01S 13/42; G01S 13/584; G01S 13/931

See application file for complete search history.

(56) References Cited

U.S. PATENT DOCUMENTS 5,613,039 A * 3/1997 Wang ...................... G01S 17/95 706/31
10,451,712 B1 * 10/2019 Madhow ............... G01S 13/723
(Continued)

FOREIGN PATENT DOCUMENTS

DE 102006054721 A1 11/2007
WO WO-2022139783 A1 * 6/2022 ......... G01S 13/4454

OTHER PUBLICATIONS

Christian Waldschmidt et al. "Automotive Radar-From First Efforts to Future Systems", IEEE Journal of microwaves, vol. 1, 2021, No. 1, S. 135-148. https://doi.org/10.1109/JMW.2020.3033616, Jan. 7, 2021.

*Primary Examiner* — Matthew M Barker

(74) *Attorney, Agent, or Firm* — Eschweiler & Potashnik, LLC

(57) ABSTRACT

According to at least one embodiment, a MIMO radar arrangement includes a radar receiver configured to generate radar reception data from radio receive signals received by a plurality of radar receive antennas. The arrangement further includes one or more signal processors configured to: generate frequency domain data for a range-Doppler bin based on the radar reception data and determine one or more peaks from the generated frequency domain data. The radar arrangement further includes a trained machine learning module configured to generate, using frequency domain data corresponding to each of the of the one or more determined peaks as input, one or more output values indicating a number of detected objects within each range-Doppler bin.

17 Claims, 23 Drawing Sheets

(56) References Cited

U.S. PATENT DOCUMENTS

| | | | | |
|---|---|---|---|---|
| 11,867,789 | B2 * | 1/2024 | Sudarsan | G01S 13/931 |
| 11,885,907 | B2 * | 1/2024 | Popov | G06V 10/82 |
| 2016/0223651 | A1 | 8/2016 | Kamo et al. | |
| 2019/0204834 | A1 * | 7/2019 | Harrison | G05D 1/0088 |
| 2021/0318424 | A1 * | 10/2021 | Wang | G01S 13/582 |
| 2022/0196798 | A1 * | 6/2022 | Chen | G01S 7/354 |

* cited by examiner

SYSTEMS, DEVICES, AND METHODS FOR RADAR DETECTION

REFERENCE TO RELATED APPLICATIONS

This application claims priority to German Application 102021110060.7, filed on Apr. 21, 2021. The contents of the above-referenced Patent Applications are hereby incorporated by reference in their entirety.

TECHNICAL FIELD

Various embodiments generally relate to radar arrangements and methods for radar detection.

BACKGROUND

Estimating the angle of arrival of objects within the field-of-view of a radar system, particularly a multiple-input multiple-output (MIMO) radar system, requires knowledge of the expected number of targets in one range-Doppler bin. This knowledge is very important for choosing angle estimation algorithms and for many advanced algorithms for the direction of arrival algorithms, e.g., Multiple Signal Classification (MUSIC), Estimation of Signal Parameters via Rotational Invariance Technique (ESPRIT) algorithms.

FIG. 12 shows one example of a MIMO radar 1200, which includes an array of N transmit antennas 1210 and an array of M receive antennas 1220. The MIMO radar 1200 thus has a virtual array of N×M virtual channels 1230 or channel elements.

In order to carry out the identification of the angles of arrival of the targets the aforementioned MUSIC or ESPRIT algorithms may be used. Such algorithms may be referred to as Subspace based algorithms. Such algorithms do not output the number of targets, but need to be fed as input the number of targets to be detected. For example, the MUSIC algorithm uses the predetermined number of targets to ignore more noise than simply picking peaks of a discrete Fourier spectrum in noise. There is therefore a need for a reliable way of estimating the number of targets, i.e. the number of signal sources, as without this information advanced processing algorithms such as MUSIC or ESPRIT simply cannot be used.

Prior approaches to identifying the number of sources may estimate the number using linear algebra with respect to FIG. 13. First, multiple data snapshots may be acquired. This allows an adequate signal to noise ratio to be achieved to carry out the subsequent calculations. Then, a covariance matrix is calculated. An eigenvalue decomposition is then performed on the covariance matrix, and a cost function calculated.

As illustrated in FIG. 13, this approach or process 1300 includes obtaining data from the virtual array 1310 of a MIMO radar (e.g., 1×M virtual channel array). The data obtained is accumulated over several or multiple snapshots over time to increase the signal-to-noise ratio (SNR) 1320 (e.g., N times). After acquiring the multiple snapshots of data, the process includes computing a covariance matrix at 1330 and then applying certain processing steps 1340, e.g., including an eigenvalue decomposition (EVD).

This approach is very compute intensive and leads to slow data acquisition which is not suitable for automotive applications. For example, for a high-resolution radar (HRR) with up to 128 virtual channels, an embedded system would have to calculate the EVD on a 128×128 matrix, which would be computationally intensive and take a lot of time. Further, the acquisition of multiple snapshots of data is also time-consuming and could require additional hardware, e.g., memory, for data acquisition and data storage.

SUMMARY OF THE INVENTION

The inventors have realized that it is possible to use a neural trained machine learning module to obtain the number of detected objects. The trained learning machine is configured to generate, using the frequency domain data from each virtual channel that corresponds to each of the of the one or more determined peaks as input, one or more output values indicating a number of detected objects in the scene being viewed.

In particular the trained machine learning module takes as inputs the values of the peaks, not all values across a data cube. This means that the amount of data being input into the trained machine learning module is limited, and allows rapid processing of an output indicating the number of detected objects without a high processing load. The number of coefficients and data defining the machine learning algorithm is also limited and capable, for example, of being installed in automobiles.

The invention is of particular value for high resolution radar with a large number n of virtual channels, for example n may be 50, or more, for example at least 100 virtual channels. In such cases the input to the trained machine learning module is n complex numbers per detected peak, a limited number of values. In this case, if a more complex algorithm were to be used such as the algorithm described above with respect to FIG. 13, it would be necessary to carry out complex calculations on matrices of order n by n rather than simply inputting a small number of complex numbers, namely n per peak, into a trained machine learning algorithm.

BRIEF DESCRIPTION OF THE DRAWINGS

In the drawings, like reference, characters generally refer to the same parts throughout the different views. The drawings are not necessarily to scale; emphasis is instead generally being placed upon illustrating the principles of the invention. In the following description, various embodiments of the invention are described with reference to the following drawings, in which.

DESCRIPTION

Figure 1:
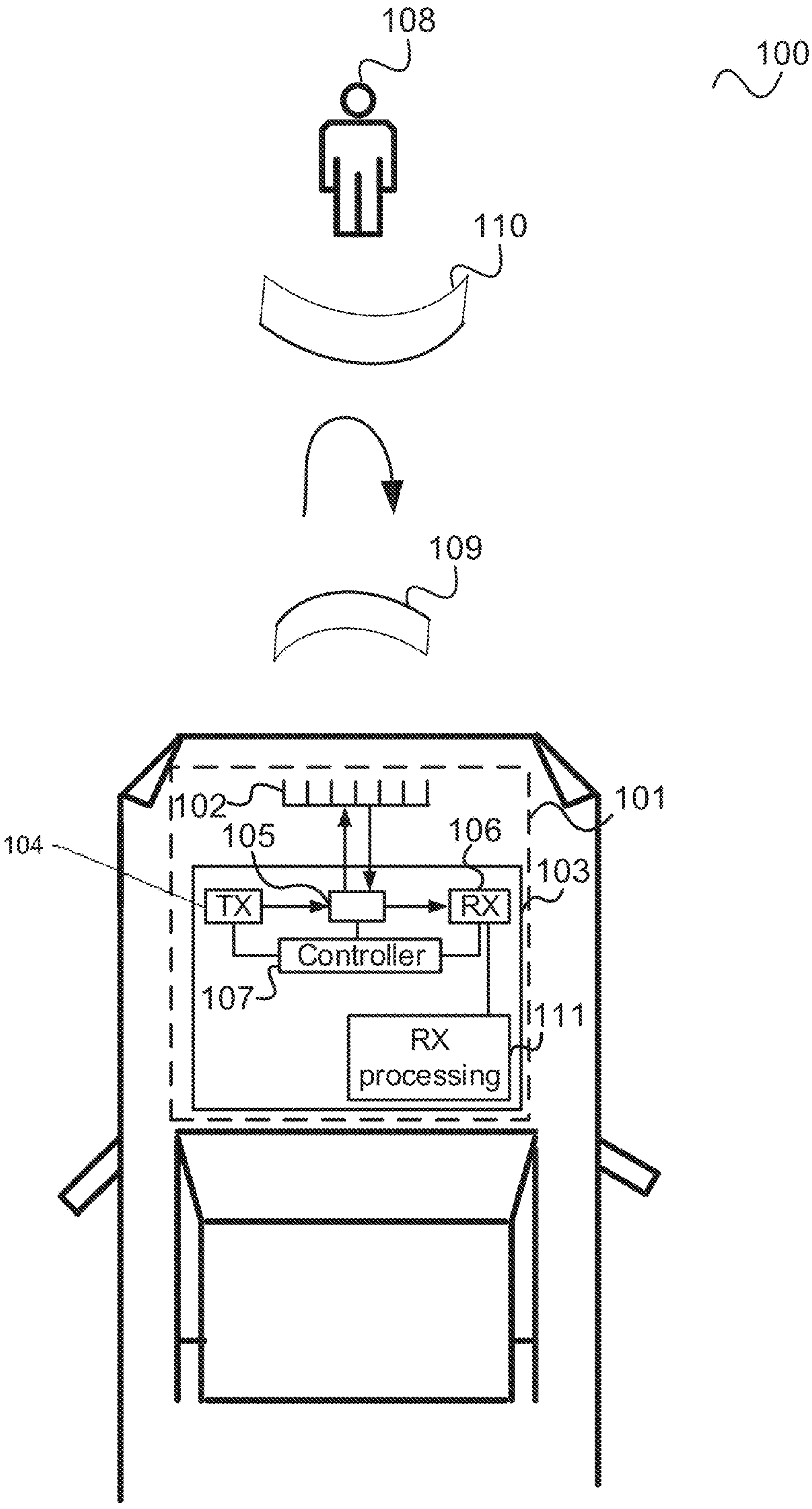
FIG. 1 shows a radar arrangement.

The following detailed description refers to the accompanying drawings that show, by way of illustration, specific details and embodiments in which the invention may be practiced.

The word "exemplary" is used herein to mean "serving as an example, instance, or illustration." Any embodiment or design described herein as "exemplary" is not necessarily to be construed as preferred or advantageous over other embodiments or designs.

The words "plurality" and "multiple" in the description or the claims expressly refer to a quantity greater than one. The terms "group (of)", "set [of]", "collection (of)", "series (of)", "sequence (of)", "grouping (of)", etc., and the like in the description or in the claims refer to a quantity equal to or greater than one, i.e., one or more. Any term expressed in the plural form that does not expressly state "plurality" or "multiple" likewise refers to a quantity equal to or greater than one. The terms "proper subset", "reduced subset", and "lesser subset" refer to a subset of a set that is not equal to the set, i.e., a subset of a set that contains fewer elements than the set.

The terms "at least one" and "one or more" may be understood to include a numerical quantity greater than or equal to one (e.g., one, two, three, four, [ . . . ], etc.).

As used herein, unless otherwise specified, the use of the ordinal adjectives "first", "second", "third", etc., to describe a common object merely indicate that different instances of like objects are being referred to, and are not intended to imply that the objects so described must be in a given sequence, either temporally, spatially, in ranking, or in any other manner.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in the form of a pointer. However, the term data is not limited to the aforementioned examples and may take various forms and represent any information as understood in the art.

The term "processor" or "controller" as, for example, used herein may be understood as any kind of entity that allows handling data, signals, etc. The data, signals, etc., may be handled according to one or more specific functions executed by the processor or controller.

A processor or a controller may thus be or include an analog circuit, digital circuit, mixed-signal circuit, logic circuit, processor, microprocessor, Central Processing Unit (CPU), Neuromorphic Computer Unit (NCU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

A "circuit" as used herein is understood as any kind of logic-implementing entity, which may include special-purpose hardware or a processor executing software. A circuit may thus be an analog circuit, digital circuit, mixed-signal circuit, logic circuit, processor, microprocessor, signal processor, Central Processing Unit ("CPU"), Graphics Processing Unit ("GPU"), Neuromorphic Computer Unit (NCU), Digital Signal Processor ("DSP"), Field Programmable Gate Array ("FPGA"), integrated circuit, Application Specific Integrated Circuit ("ASIC"), etc., or any combination thereof. Any other kind of implementation of the respective functions, which will be described below in further detail, may also be understood as a "circuit." It is understood that any two (or more) of the circuits detailed herein may be realized as a single circuit with substantially equivalent functionality. Conversely, any single circuit detailed herein may be realized as two (or more) separate circuits with substantially equivalent functionality. Additionally, references to a "circuit" may refer to two or more circuits that collectively form a single circuit.

As utilized herein, terms "module", "component," "system," "circuit," "element," "interface," "slice," "circuitry," and the like are intended to refer to a set of one or more electronic components, a computer-related entity, hardware, software (e.g., in execution), and/or firmware. For example, circuitry or a similar term can be a processor, a process running on a processor, a controller, an object, an executable program, a storage device, and/or a computer with a processing device. By way of illustration, an application running on a server and the server can also be circuitry. One or more circuits can reside within the same circuitry, and circuitry can be localized on one computer and/or distributed between two or more computers. A set of elements or a set of other circuits can be described herein, in which the term "set" can be interpreted as "one or more."

As used herein, a "signal" may be transmitted or conducted through a signal chain in which the signal is processed to change characteristics such as phase, amplitude, frequency, and so on. The signal may be referred to as the same signal even as such characteristics are adapted. In general, so long as a signal continues to encode the same information, it may be considered the same signal.

As used herein, a signal that is "indicative of" a value or other information may be a digital or analog signal that encodes or otherwise communicates the value or other information in a manner that can be decoded by and/or cause a responsive action in a component receiving the signal. The signal may be stored or buffered in a computer-readable storage medium prior to its receipt by the receiving component. The receiving component may retrieve the signal from the storage medium. Further, a "value" that is "indicative of" some quantity, state, or parameter may be physically embodied as a digital signal, an analog signal, or stored bits that encode or otherwise communicate the value.

It will be understood that when an element is referred to as being "connected" or "coupled" to another element, it can be physically connected or coupled to the other element such that current and/or electromagnetic radiation (e.g., a signal) can flow along a conductive path formed by the elements. Intervening conductive, inductive, or capacitive elements may be present between the element and the other element when the elements are described as being coupled or connected to one another. Further, when coupled or connected to one another, one element may be capable of inducing a voltage or current flow or propagation of an electromagnetic wave in the other element without physical contact or intervening components. Further, when a voltage, current, or signal is referred to as being "applied" to an element, the voltage, current, or signal may be conducted to the element by way of a physical connection or by way of capacitive, electromagnetic, or inductive coupling that does not involve a physical connection.

As used herein, "memory" is understood as a non-transitory computer-readable medium where data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, registers, shift registers, processor registers, data buffers, etc., are also embraced herein by the term memory. A single component referred to as "memory" or "a memory" may be composed of more than one different type of memory and thus may refer to a collective component comprising one or more types of memory. Any single memory component may be separated into multiple collectively equivalent memory components and vice versa. Furthermore, while memory may be depicted as separate from one or more other components (such as in the drawings), memory may also be integrated with other components, such as on a common integrated chip or a controller with an embedded memory.

The term "software" refers to any type of executable instruction, including firmware.

Exemplary embodiments of the present disclosure may be realized by one or more computers (or computing devices) reading out and executing computer-executable instructions recorded on a storage medium (e.g., non-transitory computer-readable storage medium) to perform the functions of one or more of the herein-described embodiment(s) of the disclosure. The computer(s) may comprise or include one or more of a central processing unit (CPU), a microprocessing unit (MPU), or other circuitry. It may include a network of separate computers or separate computer processors. The computer-executable instructions may be provided to the computer, for example, from a network or a non-volatile computer-readable storage medium. The storage medium may include, for example, one or more of a hard disk, a random-access memory (RAM), a read-only memory (ROM), a storage of distributed computing systems, an optical drive (such as a compact disc (CD), digital versatile disc (DVD), or Blu-ray Disc (BD), a flash memory device, a memory card, and the like. By way of illustration, specific details and embodiments in which the invention may be practiced.

FIG. 1 shows a radar arrangement 100. The radar arrangement 100 includes a radar device 101 that includes an antenna arrangement 102 and a radar control device 103. The radar control device 103 includes one or more (radar) transmitters 104, a duplexer 105 (i.e., a circuit to separate transmitted signals from received signals), a (radar) receiver 106, and a controller 107. The radar arrangement may include multiple transmit antennas in the form of a transmit antenna array and multiple receive antennas in the form of a receive antenna array.

For the detection of an object 108, the controller 107 controls the one or more transmitters 104, the duplexer 105, and the receiver 106 as follows:

1. The one or more transmitters 104 transmit a transmit signal 109 via the antenna arrangement 102.
2. The transmit signal 109 is reflected by the object 108;
3. The radar device 101 receives the echo 110 of the transmitted signal as a receive signal.

From the received signal, the radar control device 103 (e.g., a radar signal processing circuit 111) calculates information about the position and speed of the object 108.

For example, the radar device 101 may be installed in a vehicle to detect nearby objects, particularly for autonomous driving.

The transmit signal 109 may include a plurality of pulses. Pulse transmission includes the transmission of short high-power bursts in combination with times during which the radar device 101 listens for echoes 110. This is typically not optimal for a highly dynamic situation like in an automotive scenario.

Therefore, a continuous wave (CW) may instead be used as transmit signal. Since a continuous wave only allows velocity determination but does not provide range information (due to the lack of a time mark that could allow distance calculation), an approach is frequency-modulated continuous wave (FMCW) radar or phase-modulated continuous wave (PMCW) radar.

Figure 2:
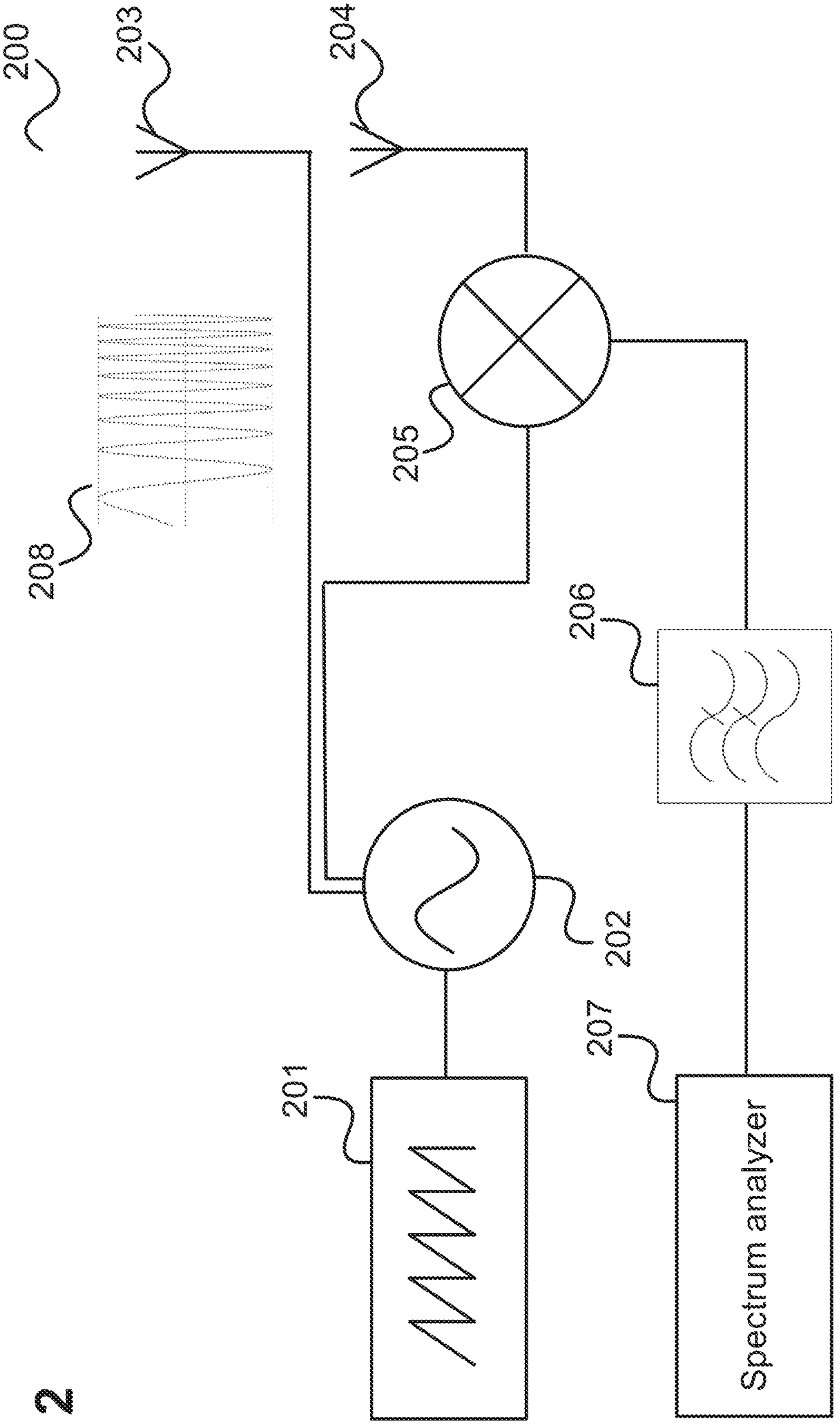
FIG. 2 illustrates an FMCW (Frequency Modulated Continuous Wave) radar system.

FIG. 2 illustrates an FMCW radar system 200. In an FMCW radar system, rather than sending a transmit signal with a constant frequency, the transmit signal frequency is periodically ramped up and reset according to a saw tooth (or alternatively a triangle) waveform 201. The saw tooth waveform 201 may, for example, be generated by a ramping circuit (or "ramper"). The saw tooth waveform 201 frequency-modulates an oscillator 202, and the resulting transmit signal is fed to a transmit antenna 203 (by means of a radio frequency (RF) frontend).

A receive antenna 204 receives the transmit signal's echo (in addition to noise, etc.) as receive signal. A mixer 205 mixes the transmit signal with the receive signal. The result of the mixing is filtered by a low pass filter 206 and processed by a spectrum analyzer 207.

The transmit signal has the form of a sequence of chirps, resulting from the modulation of a sinusoid with the saw tooth waveform 201. One single chirp 208 corresponds to the sinusoid of the oscillator signal frequency-modulated by one "tooth" of the saw tooth waveform 201 from the minimum frequency to the maximum frequency.

As will be described in detail further below, the spectrum analyzer 207 (e.g., implemented by radar signal processing circuit 111) performs two FFT (Fast Fourier Transform) stages to extract range information (by a first stage FFT, also denoted as range FFT) as well as velocity information (by a second stage FFT, also denoted as Doppler FFT) from the receive signal. It should be noted that the spectrum analyzer 207 works on digital samples, so an A/D (analog-to-digital) conversion is included in the path from the receive antenna 204 to the spectrum analyzer 207. For example, the filter 206 is an analog filter, and an analog-to-digital converter (ADC) is arranged between the filter 206 and the spectrum analyzer 207. At least some of the receive path's various components may accordingly be part of a digital or analog frontend.

To further allow determination of a direction of the object 108 with respect to the radar device 101, the antenna arrangement may include a plurality of receive antennas, i.e., an array of receive antennas. The direction of an object 108 may then be determined from phase differences by which the receive antennas receive an echo 110 from the object 108, for example, by means of a third stage FFT (also denoted as angular FFT). Accordingly, a radar receiver may include a mixer 205, an analog filter 206, and an ADC for each receive antenna.

The signals received by a plurality of antennas may be processed by means of an MMIC (Monolithic Microwave Integrated Circuit).

Figure 3:
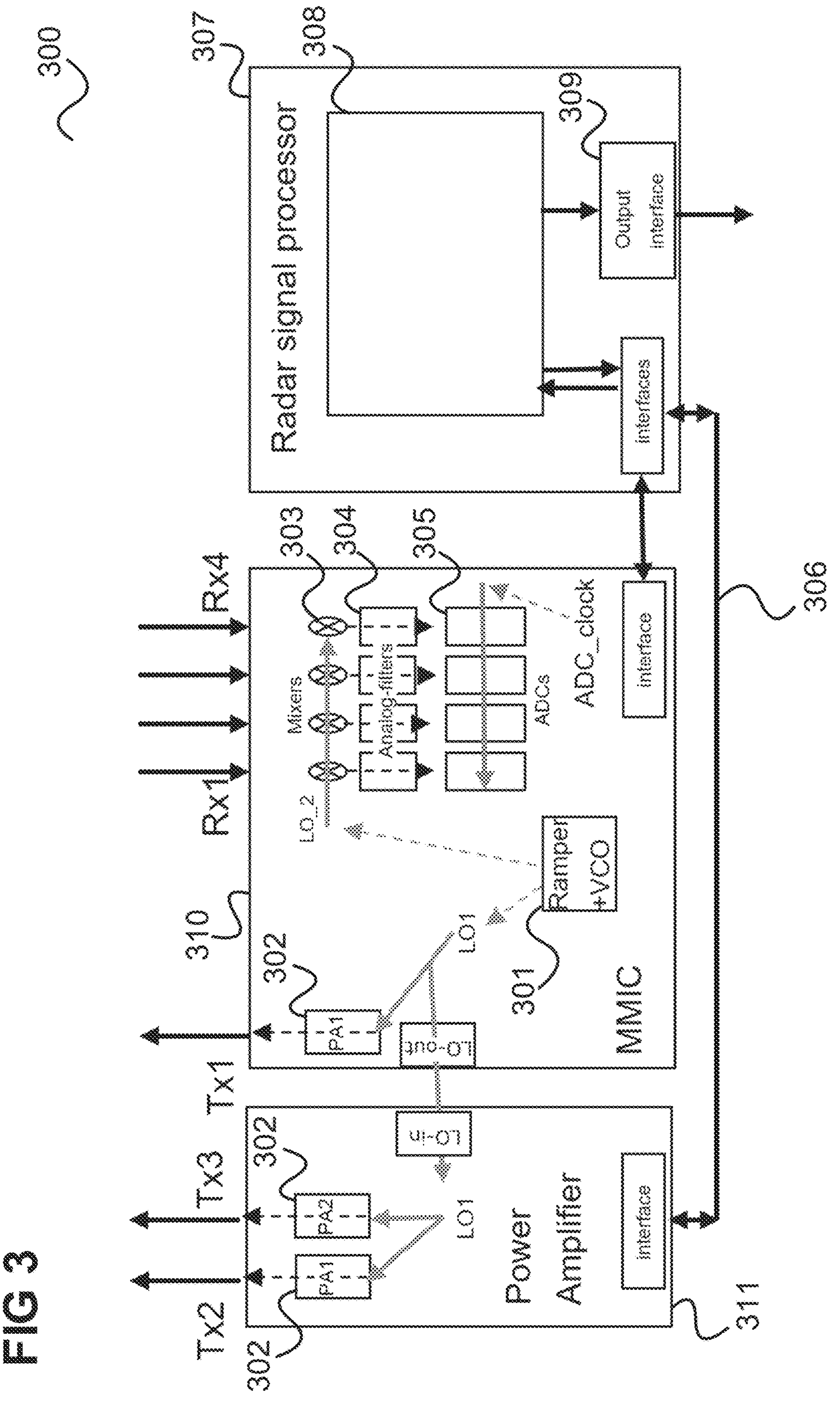
FIG. 3 shows a radar device having a plurality of transmit antennas and receive antennas.

FIG. 3 shows a radar device 300 having a plurality of transmit antennas and receive antennas. The radar device 300 includes an MMIC 310, which includes a (voltage-controlled) oscillator with ramper 301, which supplies transmit amplifiers 302 (one for each transmit antenna) and mixers 303 with a transmit signal as described with reference to FIG. 2.

In the example of FIG. 3, two of the transmit amplifiers 302 are provided by a power amplifier 311, to which the transmit signal is provided via a transmit signal interface 312. However, the transmit amplifiers may also all be provided within the MMIC 310

There is one mixer 303 in the MMIC 310 for each receive antenna. Analog filters 304 (corresponding to filter 206) filter the mixed signals, and analog-to-digital converters (ADCs) 305 generate digital signals from the filtered analog signals. The MMIC 310 transfers its output via a digital interface 306 to a radar signal processor 307.

The radar signal processor 307 has a radar signal processing circuit 308 (for example corresponding to the radar signal processing circuit 111), implements a spectrum analyzer, and performs object detection and determination of the direction of arrival as explained below with reference to FIG. 5.

Since the number of receive signals that an MMIC may process in parallel is limited (and thus an MMIC can only serve a limited number of receive antennas), multiple MMICs may be cascaded to allow using a higher number of receive antennas and thus improve the angular resolution of the radar device 101.

Figure 4:
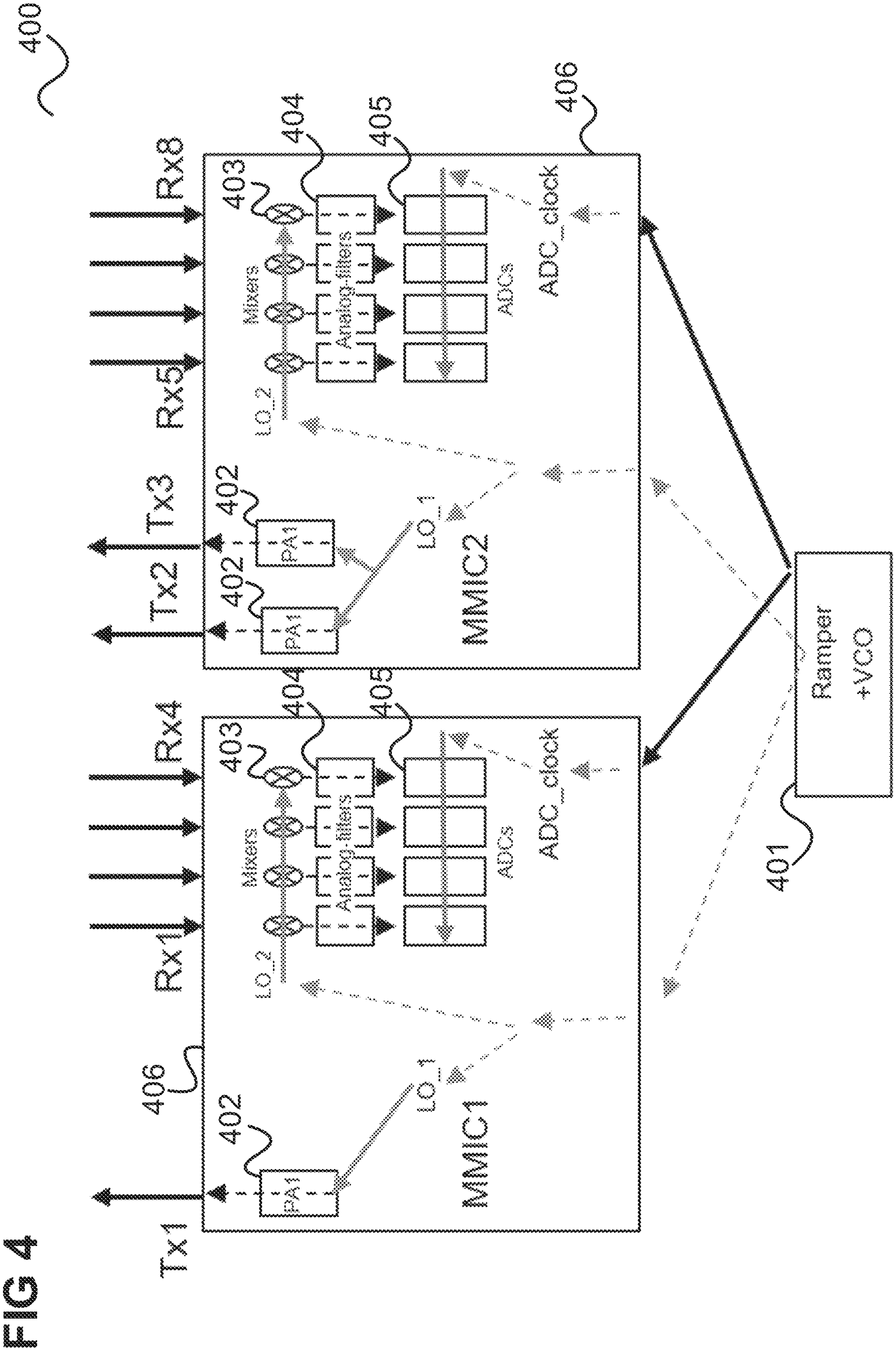
FIG. 4 shows a radar device having a plurality of MMICs (Monolithic Microwave Integrated Circuits).

FIG. 4 shows a radar device 400 having a plurality of MMICs 406. The radar device 400 includes a (voltage-controlled) oscillator with ramper 401, which supplies transmit amplifiers 402 (one for each transmit antenna) and mixers 403 of the MMICs 406 with a transmit signal as described with reference to FIG. 2.

There is one mixer 403 in each MMIC 406 for each receive antenna of the respective MMIC 406. Analog filters 404 (corresponding to filter 206) filter the mixed signals, and analog-to-digital converters (ADCs) 405 generate digital signals from the filtered analog signals. Similar to the example of FIG. 3, the MMICs 406 may transfer their outputs via a digital interface to a radar signal processor (not shown in FIG. 4), which implements a spectrum analyzer and performs object detection and determination of the direction of arrival as explained in the following with reference to FIG. 5.

Figure 5:
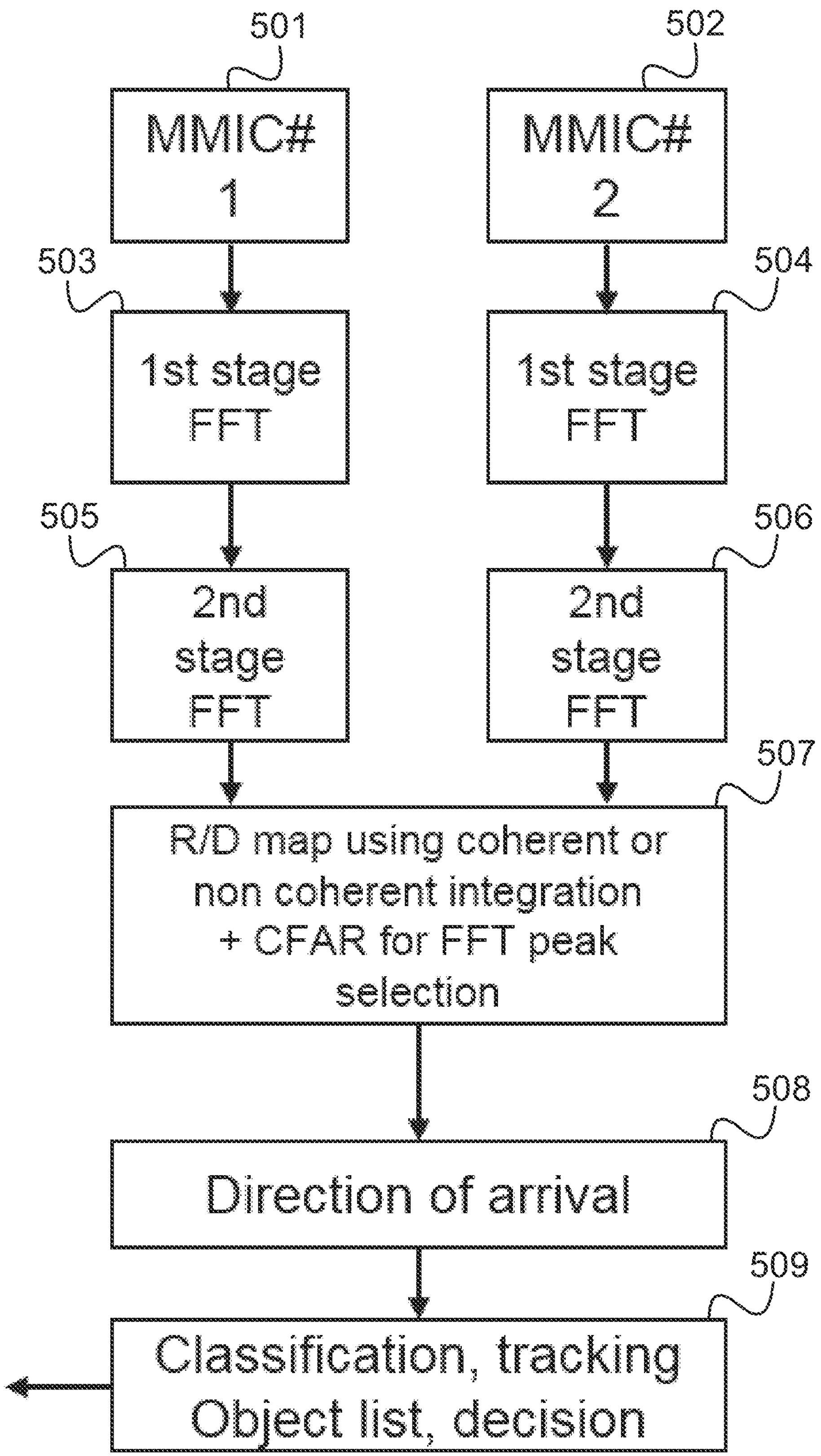
FIG. 5 illustrates the processing of radar signals received using two MMICs.

FIG. 5 illustrates the processing of radar signals received using two MMICs 501, 502.

MMICs 501, 502 are, for example, part of the receiver 106. Each MMIC 501, 502 is coupled with a plurality of antennas and is supplied with received signals from the respective plurality of antennas. The MMICs 501, 502 perform processing of the received signals like amplification, frequency down conversion (for example, the functionality of mixer 205 and filter 206), and A/D conversion. The MMICs may also implement the duplexer 105, i.e., may be configured to separate transmission signals from reception signals. Each MMIC 501, 502 supplies the resulting digitized receive signals to a respective first FFT (Fast Fourier Transform) stage 503, 504 and respective second FFT stage 505, 506 (e.g., implemented by a radar signal processor 307). Based on the outputs of the FFT stages 503-506, the radar signal processor 307 determines range information as well as velocity information (e.g., in the form of an R/D (range/Doppler) map) for one or more objects in 507.

It should be noted that each second FFT stage 505, 506 outputs a two-dimensional FFT result (wherein one dimension corresponds to the range and the other to velocity) for each antenna (namely based on the processing of the samples of the receive signal received by this specific antenna). The result of the first FFT stage 505 includes, for each receive antenna, a complex value for a range bin.

The FFT of the second FFT stage 506 goes over the result of the first FFT stage 505 over multiple chirps, for each range bin, generating, per range bin, a complex value for each Doppler bin. Thus, the result of the second FFT stage 506 includes, for each receive antenna, a complex value for each combination of Doppler bin and range bin (i.e., for each Doppler/range bin). This can be seen to give an antenna-specific R/D map.

To generate an aggregate R/D map, the MMIC-specific R/D maps are combined together, e.g., by summing the up, for example, by coherent or non-coherent integration. The velocity and range of specific objects may be estimated by identifying peaks in the R/D map, e.g., by means of a CFAR (Constant False Alarm Rate) algorithm. It should be noted that since an FFT output consists in general of complex values, a peak selection in an FFT output (such as the aggregate R/D map) may be understood as a selection based on absolute values (i.e., complex magnitudes of the complex outputs) or power (i.e., squares of absolute values).

The range Doppler map is typically in the form of a data cube having as its transformed axes firstly a range direction, secondly a Doppler direction and thirdly a virtual channel direction. The peaks may be identified in the range Doppler map by summing the intensity of the peaks in the third virtual channel direction, and identifying the locations of the maxima of intensity in the range and Doppler direction. The output of the peak detector then submits the location of this peak or these peaks.

As will be explained in more detail below, for example with reference to FIG. 17, the vectors in the virtual channel direction at the peaks is then determined.

Then, as described below, for instance with respect to FIG. 14, but not shown in FIG. 5, these vectors at the peaks are used to identify the number of objects, also referred to as targets, in the scene. This information together with the data cube is then fed to the next step 508.

In 508, the radar signal processor 307 may further determine the direction of the one or more objects in 508. This can be done based on the phase differences of the output values of the second stage FFT between different receive antennas and may include a third stage FFT (angular FFT).

In particular, such processing may be carried out using an algorithm, such as MUSIC or ESPRIT, requiring the input of the number of objects. Such algorithms are used as a replacement for algorithms based directly on seeking peaks in the Fourier-transformed data cube. The inventors have realized that it is possible to obtain this number other than by a conventional approach using linear algebra; the alternative approach will be described in detail below.

Based on the results of this processing, further processing such as object classification, tracking, generation of an object list, and decision-making (e.g., in autonomous driving) may be performed in 509 (e.g., by a further component such as a vehicle controller). For this, the radar signal processor 307 may output the processing results via an output interface 309.

In the case of two MMICs 501, 502, the data cube which contains the digitized receive signals for all receive antennas is split into two parts, one for each MMIC 501, 502.

Figure 6:
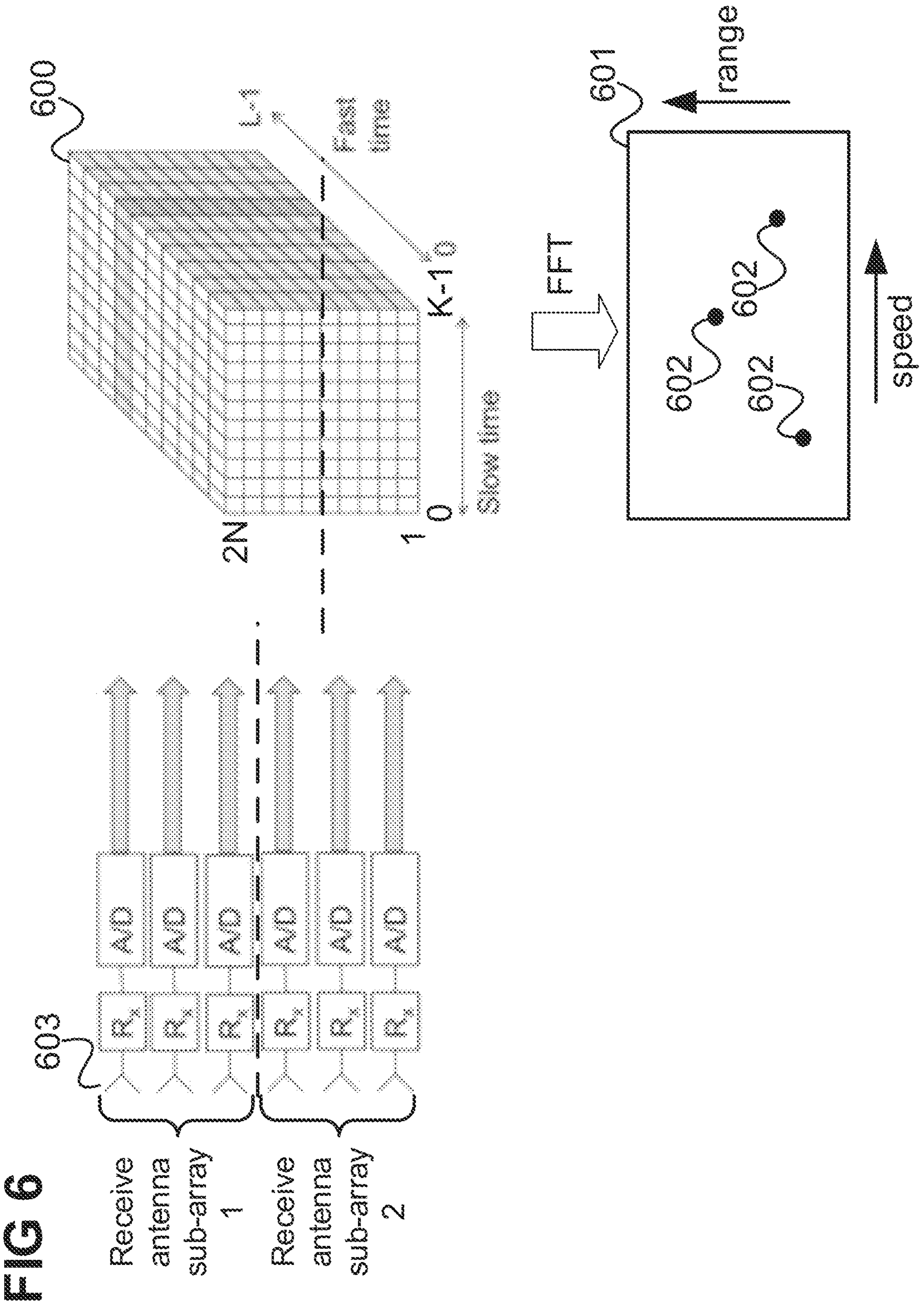
FIG. 6 shows a data cube.

FIG. 6 shows a data cube 600. The data cube 600 includes digitized samples of receive signals from M antennas forming a receive antenna array 603 divided into two receive antenna sub-arrays. For example, the first MMIC 501 processes receive signals received by the first receive antenna sub-array, and the second MMIC 502 processes receive signals received by the second receive antenna sub-array. In particular, the MMICs 501, 502 perform analog/digital conversion to generate the digitized samples.

For example, for each chirp, the received signal is sampled to have L samples (e.g., L=512).

The L samples collected for each chirp are processed by the respective first FFT stage 503, 504.

The first-stage FFT is performed for each chirp and each antenna, so that the result of the processing of the data cube 600 by the first FFT stage 503, 504 has again three-dimension and may have the size of the data cube 600 but does no longer have values for L sampling times but instead values for L range bins.

The result of the processing of the data cube 600 by the first FFT stage 503, 504 is then processed by the second FFT stage 505, 506 along with the chirps (for each antenna and for each range bin).

The direction of the first-stage FFT is referred to as fast time, whereas the second-stage FFT direction is referred to as slow time.

The result of the second-stage FFT gives, when aggregated over the antennas, a range/Doppler (R/D) map 601, which has FFT peaks 602 (i.e., peaks of FFT output values (in terms of absolute values) for certain range/speed combinations (i.e., for certain range/Doppler bins) which the radar signal processor 307 expects to correspond to detected objects 108 (of a certain range and speed).

In practical application, phase errors between multiple cascaded MMICs 501, 502 add phase errors to the second stage FFT results between different antennas that cause a loss of angular precision or even a loss of sensitivity. For angular detection, an angular FFT may be performed in the antenna direction (vertical axis of the data cube in FIG. 6).

High frequency signals of the same nature (transmit signals and receive signals) must have the same length from their source and/or to their destination to avoid creating an unbalanced delay. Symmetry in delay can be defined by silicon design and by radar PCB (printed circuit board), and antenna design. Unfortunately, changes in temperature, in voltage and aging will create asymmetric changes in delay. A small delay creates a phase error, while a big delay would create a phase error and a frequency error when considering the fast-changing frequency during the chirps of an FMCW Radar.

Even single MMICs are not perfect; although most stringent measures are typically taken during their design, all measures cannot cope with each potential variation when considering manufacturing variations, variations induced by ECU conditions, and aging.

For example, the arrows shown within the MMIC 310 illustrated the different paths that are introducing potential delays.

The principle of MIMO (multiple-input multiple-output) is to expand the aperture of the radar device using virtual channels formed by the combination of the receive antenna array and of the transmit antenna array. In the example of FIG. 3, where there are three transmit antennas (Tx1 to Tx3) and four receive antennas (Rx1 to Rx4), the result are 12 virtual channels as illustrated in FIG. 7.

Figure 7:
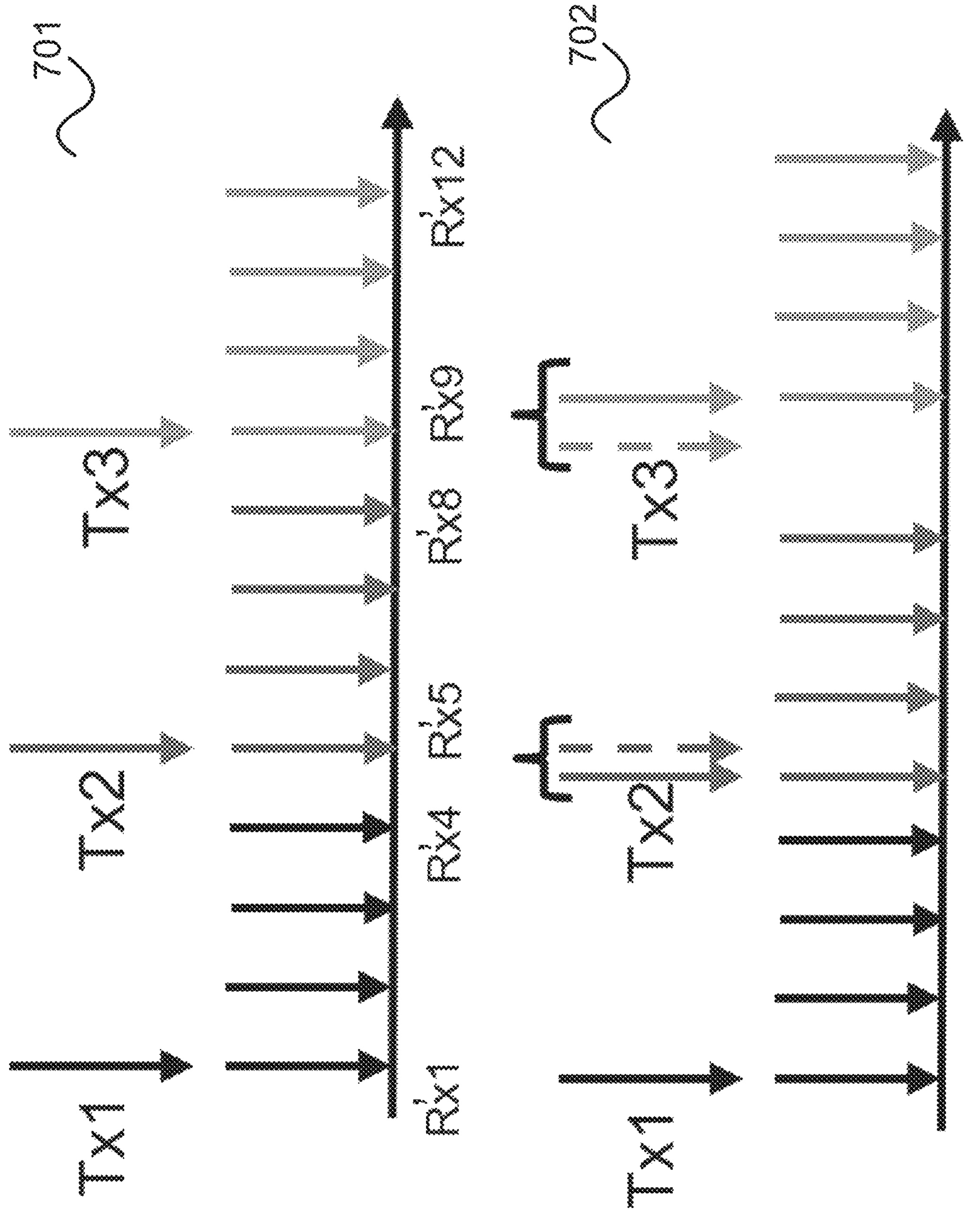
FIG. 7 shows diagrams illustrating virtual radar channels.

FIG. 7 shows diagrams 701, 702 illustrating virtual radar channels. The first diagram 701 shows the virtual receive antenna array of the MMIC 310, assuming that the MMIC 310 is perfect (i.e., error-free). Each transmit antenna creates one virtual receive antenna per actual receive antenna (Rx1 to Rx4), resulting in twelve virtual receive antennas denoted as (Rx'1 to Rx'12). With the ideal phase differences between Tx1, Tx2, and Tx3, the virtual receive antennas form an antenna array of uniformly spaced receive antennas.

The second diagram 702 shows the virtual receive antenna array of the MMIC 310, assuming that the MMIC has phase errors (offsets) between its transmit antennas. Tx1 is used as a reference, and for Tx2 and Tx3, the dashed arrows show the theoretical position with the theoretical phase while the plain arrows show examples of phase errors. Since each phase corresponds to a horizontal position in the virtual receive antenna array, the phase errors of Tx2 and Tx3 have the effect that the positions of the virtual receive antennas Rx'5 to Rx'8 are shifted to the left (since Tx2 is "too early"). The virtual receive antennas Rx'6 to Rx'12 are shifted to the right (since Tx3 is "too late"), assuming a radar signal arriving from the left.

Accordingly, the determination of the angle of arrivals using the virtual receive antennas will have errors.

In a practical radar device, e.g., in a radar ECU (electronic control unit) in a vehicle, errors can be quite well compensated at the final test of the radar device by determining and setting corresponding calibration variables (or calibration values). Still, during its lifetime, a radar device will typically be exposed to conditions that create asymmetric phase changes compared to those compensated with the calibration variables. They can be, for example, asymmetric junction temperatures between Tx paths, asymmetric junction temperatures between Tx paths and Rx paths, asymmetric transmit powers between Tx paths, asymmetric losses on the RF circuit substrate due to uneven temperatures on the substrate, and asymmetric losses and asymmetric gain between Rx paths.

A radar device implemented using a single MMIC, and an external power amplifier (as illustrated in FIG. 3) is affected by similar errors as a radar device with a single MMIC (and all transmit amplifiers within the MMIC), except that the amplitude of errors will be different due to the phase error induced by the LO signal going across 2 components instead of 1 component.

Figure 8:
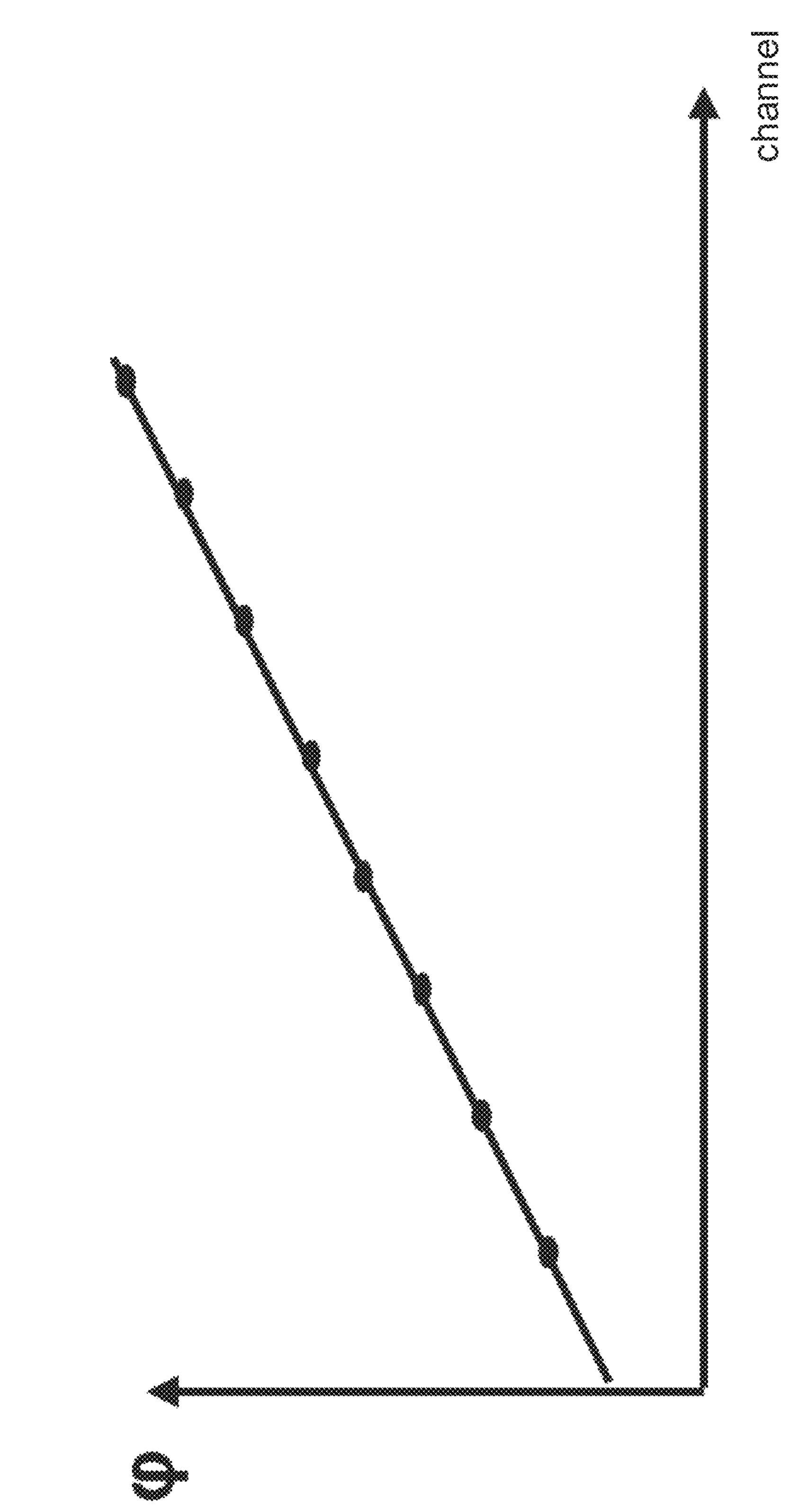
FIG. 8 shows a diagram illustrating the ideal relation between antenna number and phase.

FIG. 8 shows a diagram 800 illustrating the ideal relation between antenna number (or the number of Rx channel, indicated along the x-axis) and phase (indicated along the y-axis).

The ideal relation is that the phase various linearly over the receive antenna array (according to the direction the object 108 has with respect to the antenna arrangement 102).

It should be noted that it is assumed that the antennas are numbered in the order as they are arranged in the antenna array.

Figure 9:
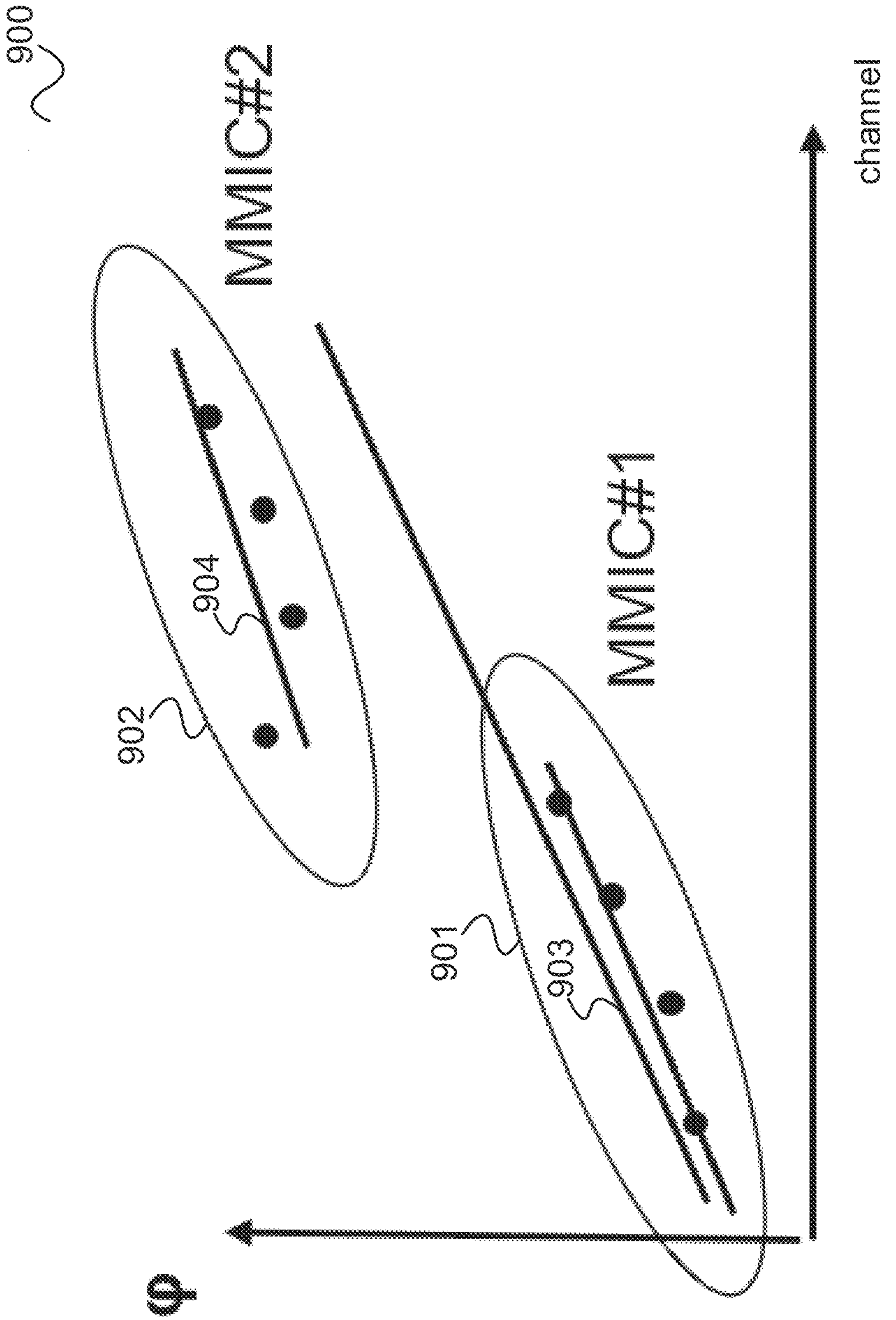
FIG. 9 shows a diagram illustrating an example of the relation between antenna number and phase as it may occur in practical application.

FIG. 9 shows a diagram 900 illustrating an example of the relation between antenna number and phase as it may occur in practical application.

It is assumed that the first four samples (from left to right) forming a first sample group 901 belong to channels served by a first component, and the fifth to eighth samples forming a second sample group 902 belong to channels served by a second component. As illustrated by lines 903, 904, there is an almost linear relation between phase and antenna number within each sample group 901, 902. However, between the sample groups 901, 902, there is a discontinuity due to a phase error between the components.

When several MMICs are cascaded to form a coherent receive array with Tx channels coming from each of the MMIC, the combined effects of delays are generating much more complex measurement errors. An example would be where two of the MMICs 310 are arranged next to each other (e.g., controlled by a master MMIC distributing oscillation and clock signals to the MMICs; the master MMIC may be a dedicated MMIC or one of the two MMICs).

In addition to the sources of delay errors within one MMIC (as illustrated in FIG. 3), additional errors may arise due to asymmetries between the MMICs, particularly in the distribution of oscillation signals and clock signals to the MMICs.

Figure 10:
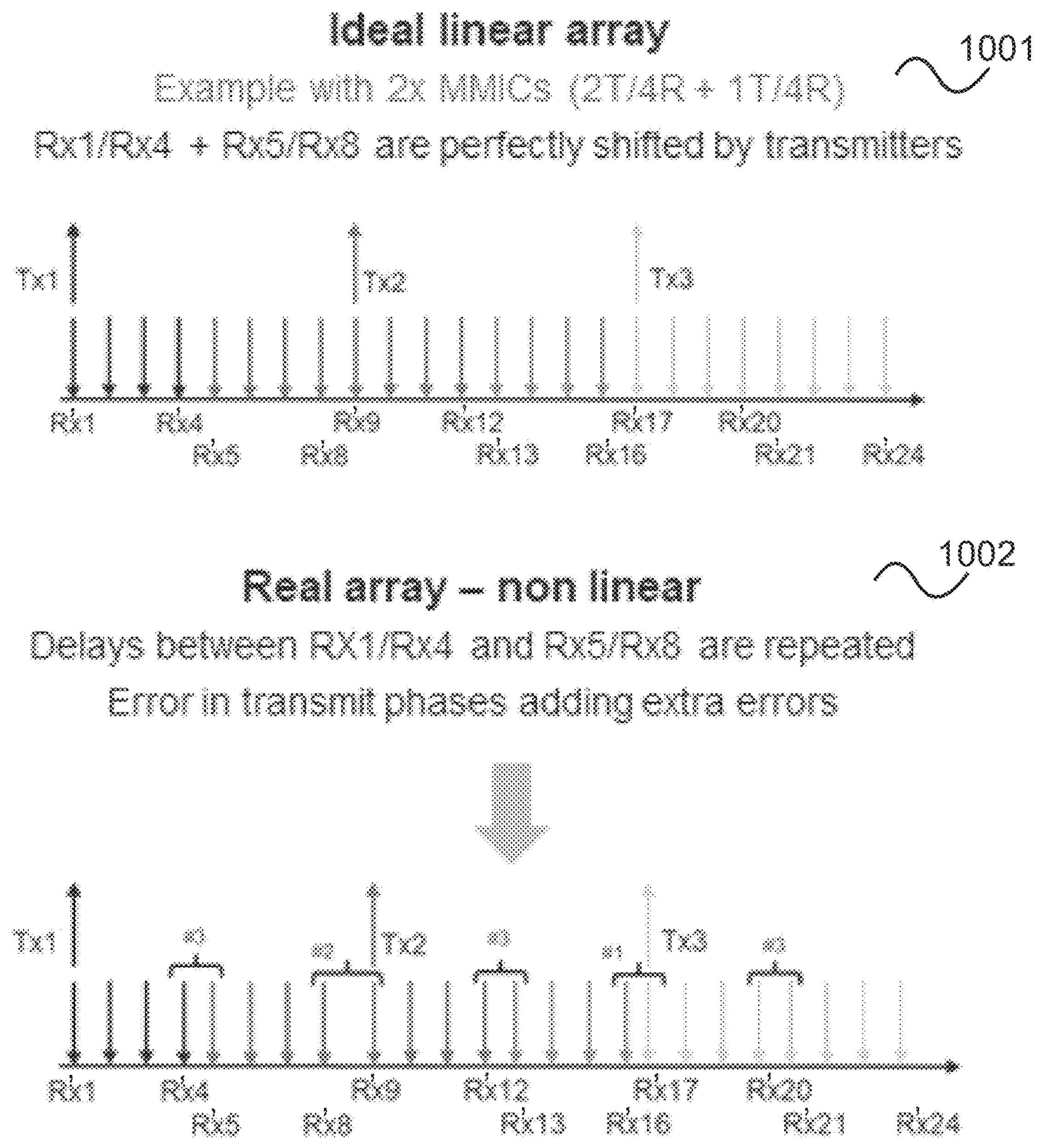
FIG. 10 shows diagrams illustrating virtual radar channels in the case of two MMICs.

FIG. 10 shows diagrams 1001, 1002 illustrating virtual radar channels in the case of two MMICs. In this example, there is one MMIC with two transmit antennas (Tx1, Tx2) and four receive antennas (Rx1 to Rx4), and one MMIC with one transmit antenna (Tx3) and four receive antennas (Rx5 to Rx8). This results in 24 virtual receive antennas (Rx'1 to Rx'24).

The first diagram 1001 shows the virtual receive antenna array of the MMICs, assuming that the MMICs are perfect (i.e., error-free). With the ideal phase differences between Tx1, Tx2, and Tx3, the virtual receive antennas form an antenna array of uniformly spaced receive antennas.

The second diagram 1002, shows the virtual receive antenna array that the MMICs have phase errors (offsets) between their transmit antennas. Specifically, in the second diagram, the results of phase errors between transmit antennas (indicated by #1, #2) and between the MMICs (indicated by #3) are indicated.

It can be seen that the complexity of the errors is drastically increased when using multiple MMICs compared to the usage of a single MMIC.

With cascaded radar components, additional reception errors can be caused by differential phase delays between the local oscillation signal (supplied to mixers 303) at each of the reception sub-arrays of, e.g., a first MMIC and a second MMIC. Similarly, clock skew of ADC clocks can lead to measurement errors.

This results in groups of samples (e.g., Doppler FFT stage output samples) with phase differences leading to a situation illustrated in FIG. 9 (assuming two MMICs and a single transmitter for simplicity).

Typically, an MMIC uses two main techniques for signal sampling: real sampling or I/Q (in-phase/quadrature) sampling. While the examples before have been focused on real sampling, the approaches described herein are also applicable to I/Q sampling, for which several measurement errors can be generated by the MMIC and corrected in the frequency domain during signal processing.

For example, because of their complexity, I/Q sampling circuits may suffer from asymmetry across Rx channels. This asymmetry will typically generate angular errors (i.e., errors in angular detection of objects).

Figure 11:
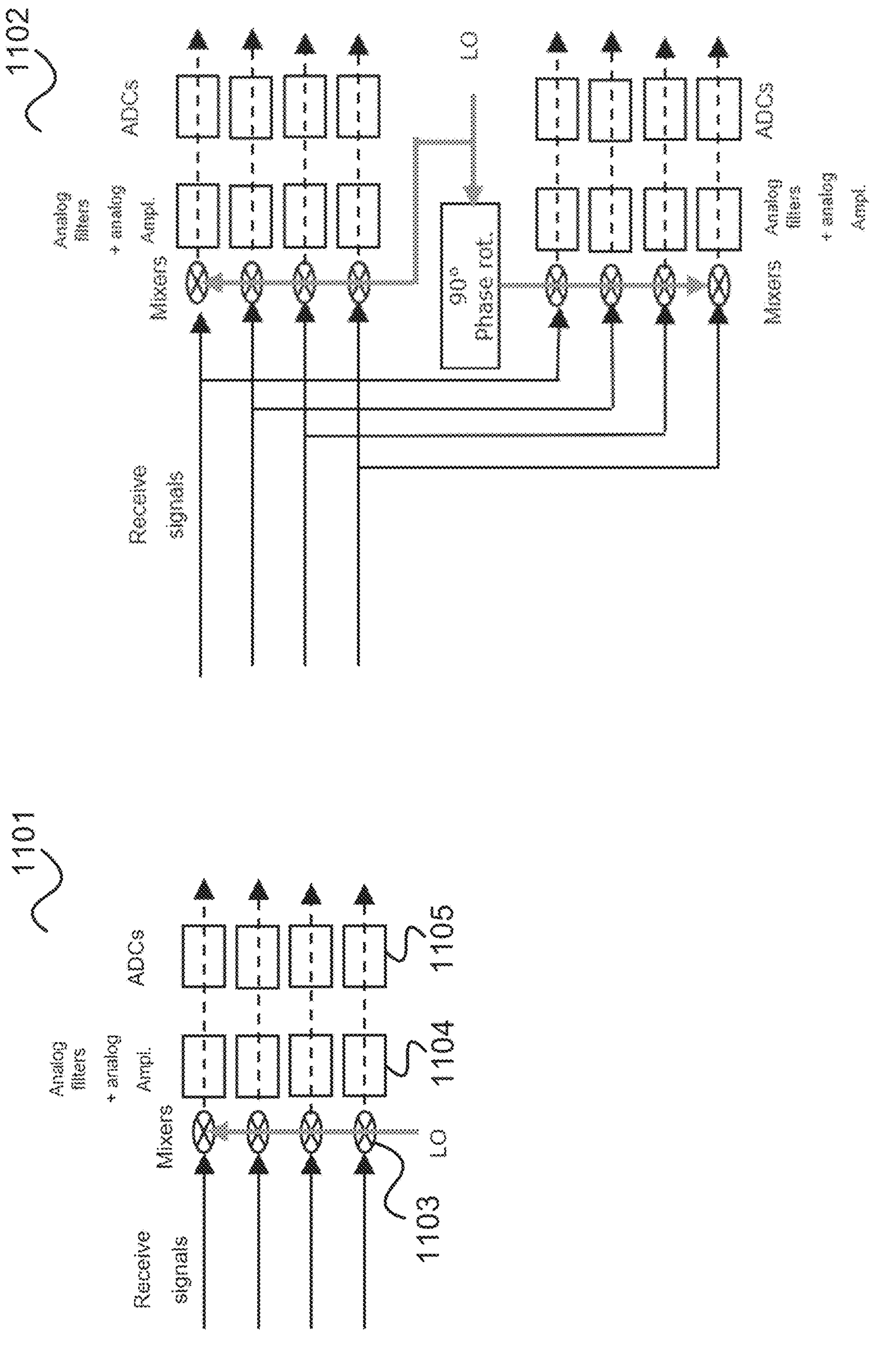
FIG. 11 shows a comparison of a real receiver and an I/Q receiver.

FIG. 11 shows a comparison of a real receiver 1101 and an I/Q receiver 1102.

The real receiver 1101 includes, as explained with reference to FIGS. 2 and 3, a mixer 1103, a filter 1104, and an analog-to-digital converter 1105 per receive path.

The I/Q receiver 1102 includes two such blocks, wherein the mixers of one block are supplied with an oscillation signal which has a 90° phase shift with respect to the oscillation signal supplied to the mixers of the other block.

In the following, examples are given for cases of a MIMO radar system (e.g., FMCW) that includes one or more radar devices, in particular, one or more radar transmitters and one or more radar receivers). The MIMO radar system and may use any form of modulation (for example: TDM (Time Division Multiplexing), DDM (Doppler Division Multiplexing), BPSK (Binary Phase Shift Keying)). Embodiments are valid for a radar system having a single MMIC or having multiple MMICs. The MIMO radar system may also be a PMCW radar system or an OFDM (Orthogonal Frequency Division Multiplexing) radar system. The embodiments may also be valid for a radar system using MMICs with or without signal processing capabilities.

Figure 12:
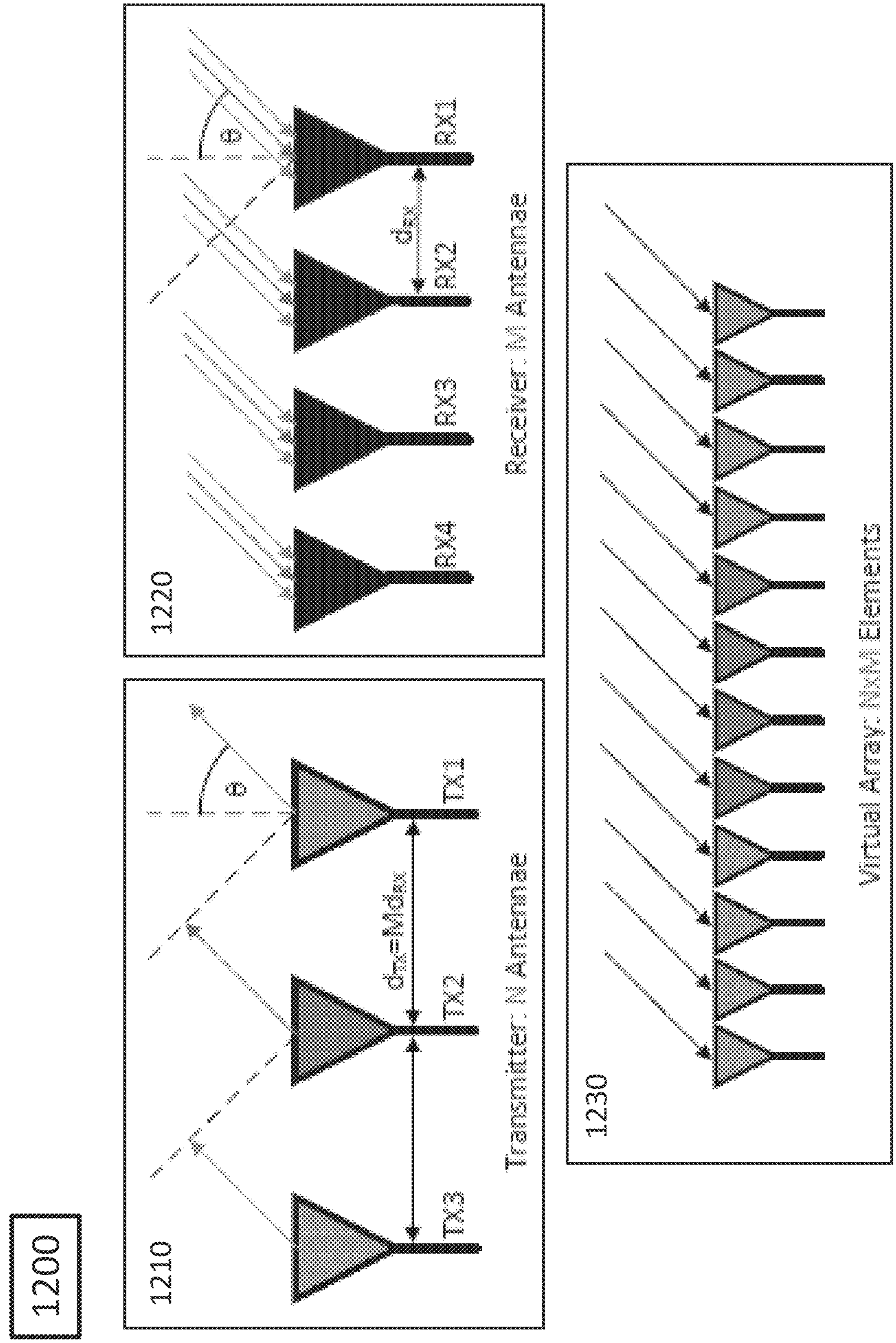
FIG. 12 shows an aspect of a MIMO radar.
Figure 13:
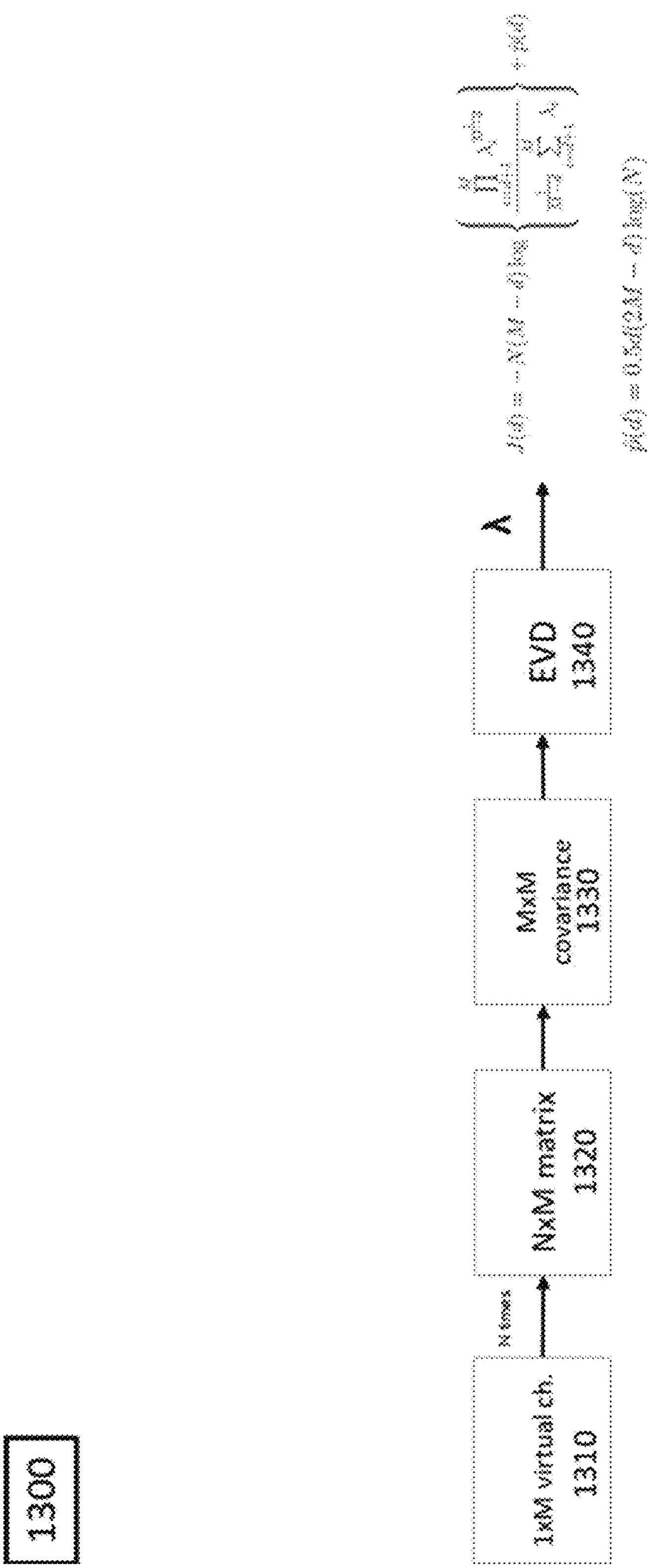
FIG. 13 (Prior art)
FIG. 13 shows a flow diagram illustrating a processing for object detection using MIMO radar.
Figure 14:
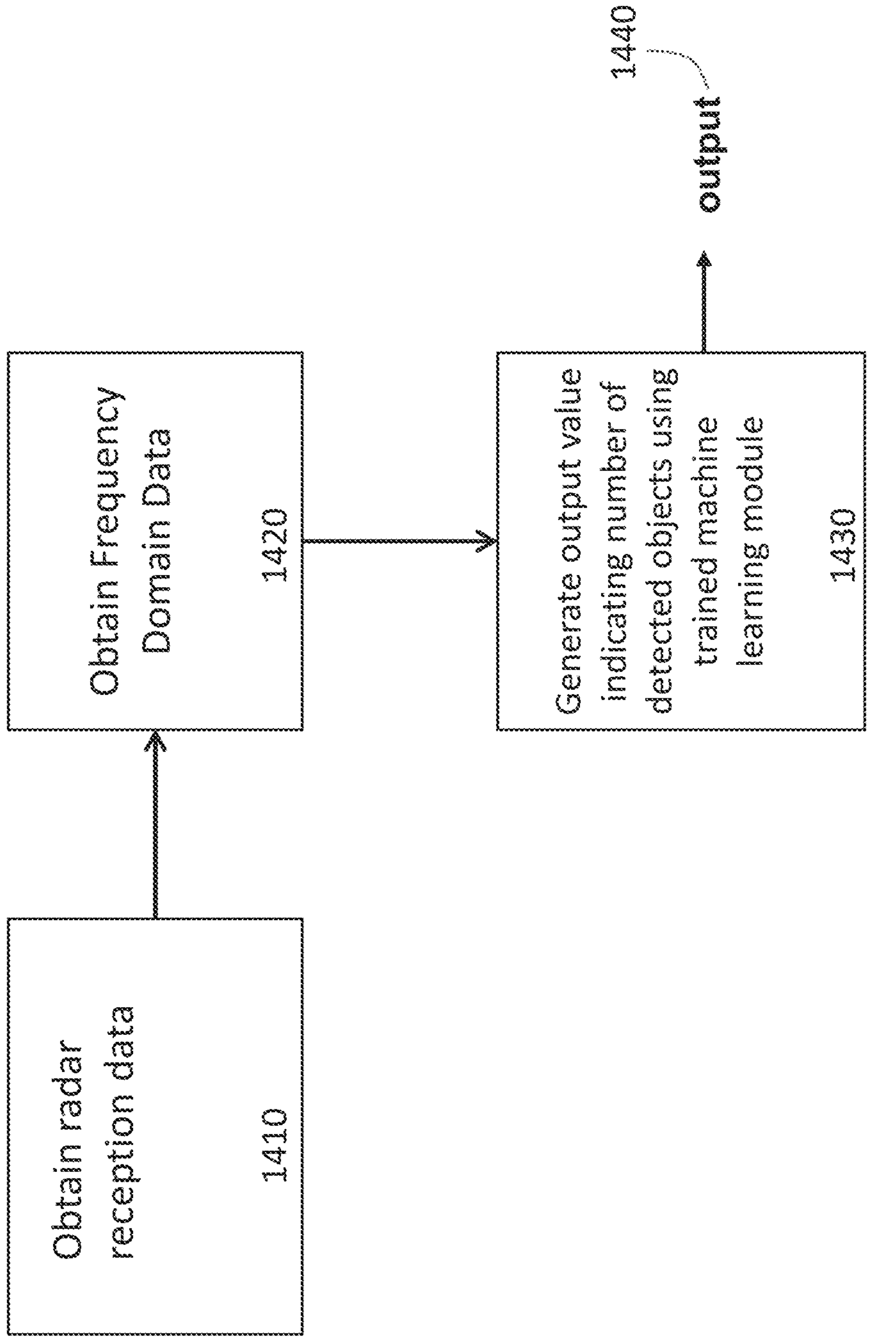
FIG. 14 shows an exemplary flow diagram depicting a process for radar object detection using a MIMO radar arrangement.

FIG. 14 shows a block diagram depicting a flow process 1400 for radar object detection implemented by a MIMO radar arrangement. The process may include the use of standard operating radar processing techniques. The MIMO radar arrangement used for the flow process 1400 can include any suitable MIMO radar system as described herein. For example, the MIMO radar arrangement includes transmit and receive antennas and virtual channels as depicted in FIG. 12.

Figure 15:
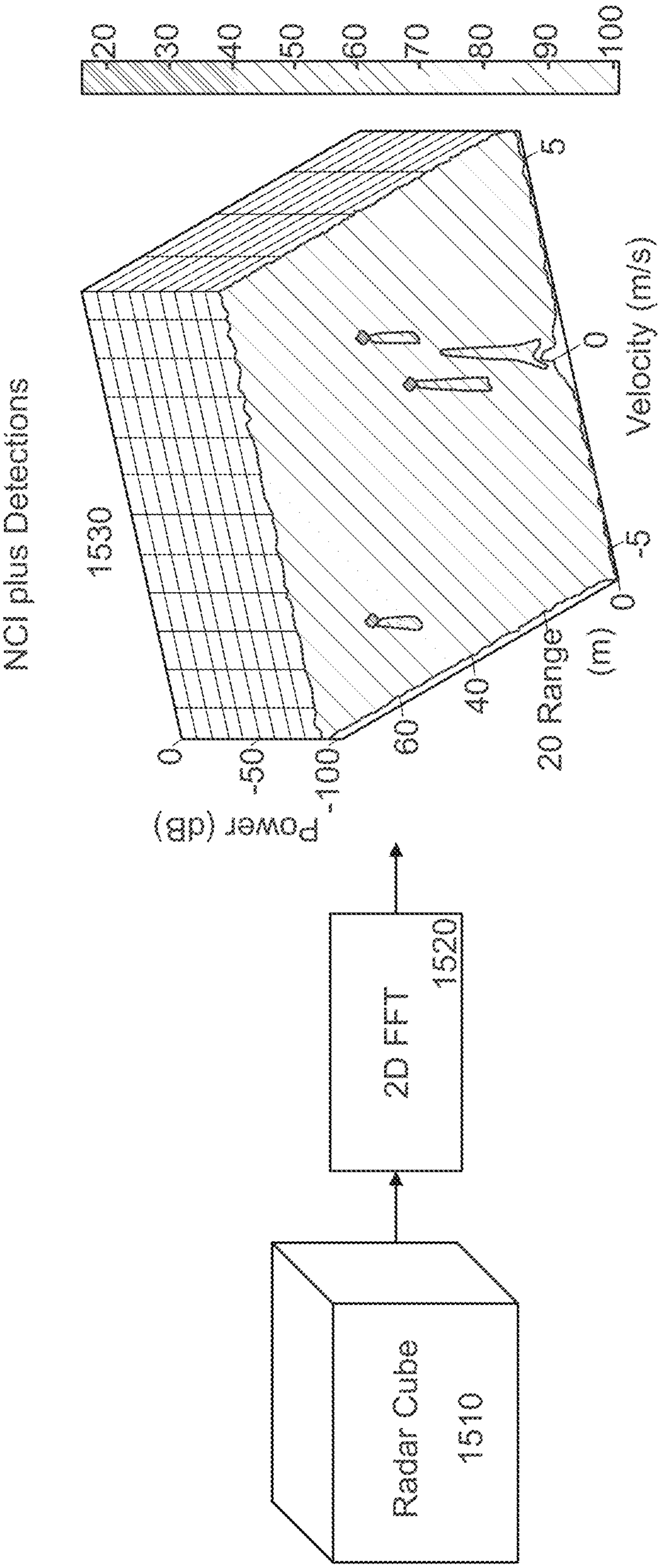
FIG. 15 shows a radar processing flow in accordance with exemplary embodiments of the present disclosure.

In FIG. 14, radar reception data is obtained at 1410. For example, a virtual array 1410 of the MIMIO radar system obtains radar receive signals from virtual channels, which can then be digitized. For example, as shown in FIG. 15, a MIMO radar system can generate a radar or data cube 1510, which can be digitized version of signals received from virtual channels of a virtual array for the MIMO radar system.

After obtaining the radar reception data, at 1420, frequency domain data can be obtained. As described previously, the radar reception data can be processed to produce a range-Doppler bin data or range-Doppler bin map. In particular, a 2D FFT can be performed. For example, FIG. 15 shows a 2D FFT can be performed in 1520 on data from the data or radar cube 1510.

The 2D FFT may be performed as two one dimensional (1D) FFTs. That is, as described herein, the 2D FFT may be performed in stages. For example, two FFT (Fast Fourier Transform) stages can be performed on digitized receive data or data cube 1500 to extract range information (a first stage FFT or range FFT) as well as velocity information (a second stage FFT or Doppler FFT). The range-Doppler bin data can be in the form of complex values.

Figure 16A:
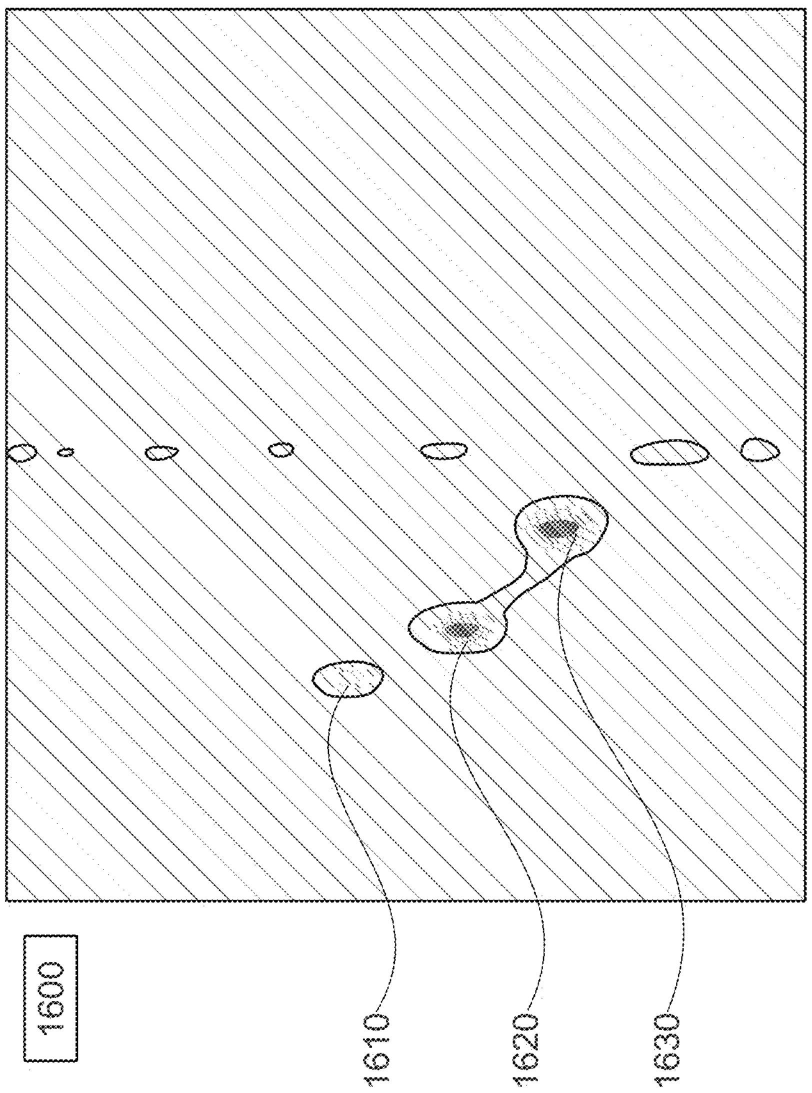
FIG. 16A show an exemplary graphical representation of results of a 2D FFT according to embodiments of the present disclosure.

FIG. 16A shows an exemplary range-Doppler map 1600 having peaks 1610, 1620 and 1630. A peak detection method or algorithm, such as one implemented by a computing device including instructions or software (e.g., including at least one signal processor) may be implemented to identify such peaks.

Figure 16B:
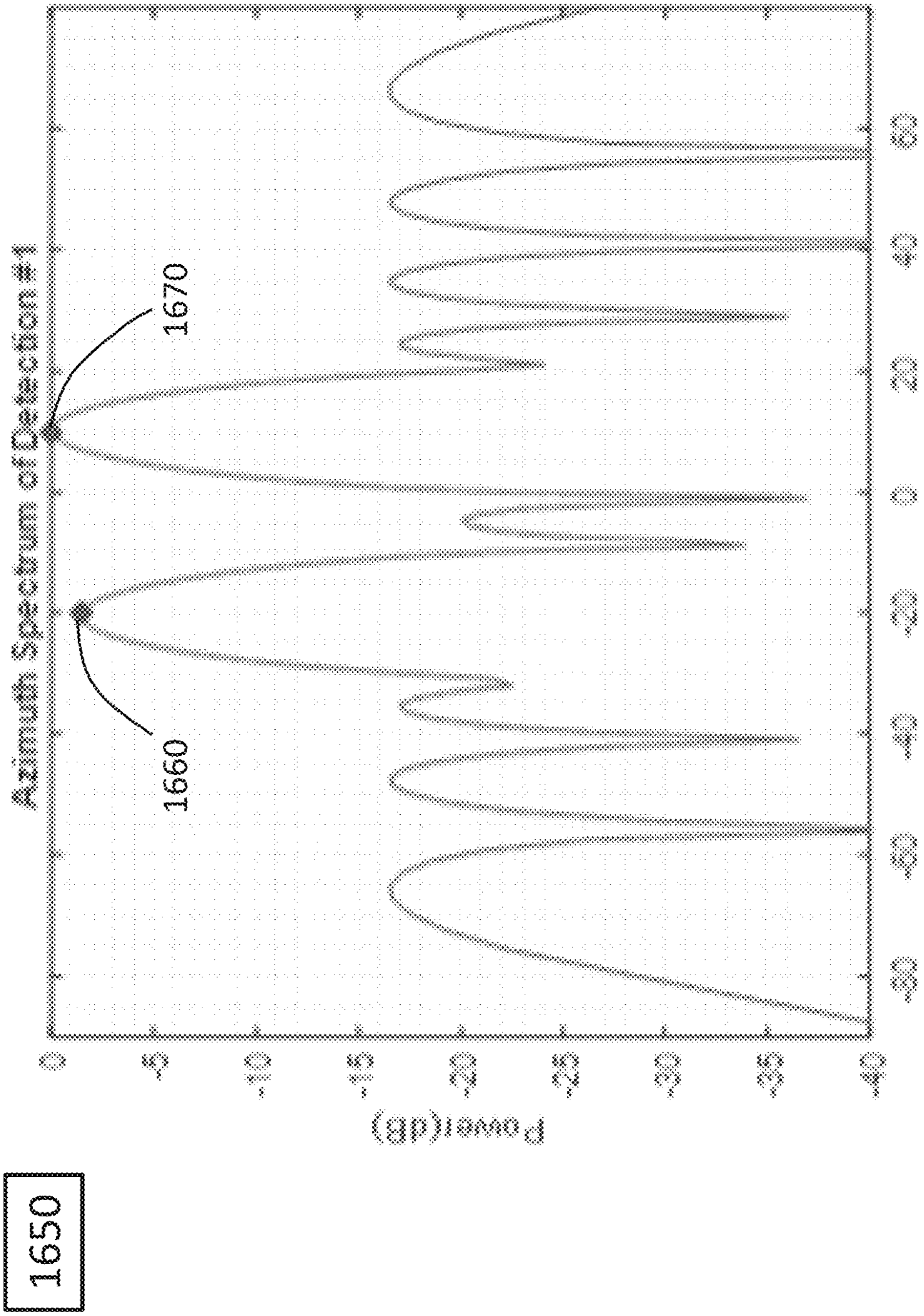
FIG. 16B shows an exemplary plot of azimuth spectrum from of Doppler-range data.

FIG. 16B shows a graphical example of peaks being identified from the range-Doppler data. The graph 1650 shows an example of a 2D plot of (azimuth) angle versus power which can be produced from range-Doppler data. As can be seen, two peaks 1660 and 1670 may be identified, e.g., using known peak identification processes or methods.

Figure 17:
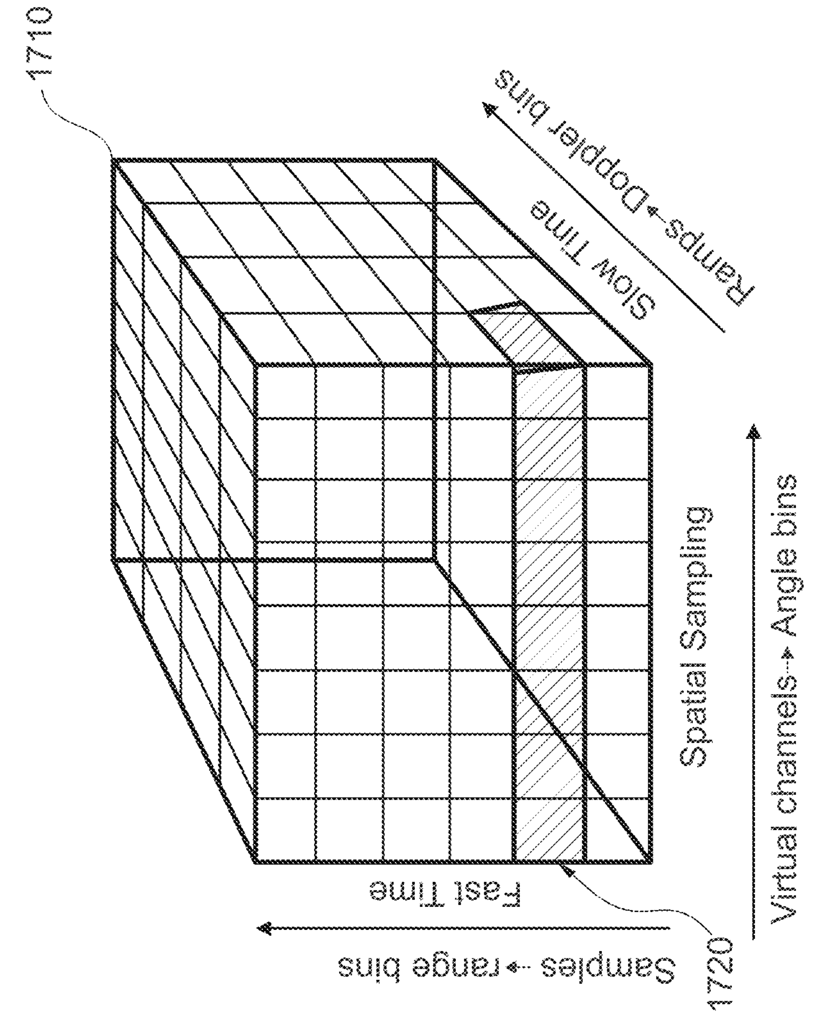
FIG. 17 shows a data cube with an exemplary range-Doppler bin highlighted within the data cube.

FIG. 17 shows an example a data cube where one range-Doppler bin 1720 is highlighted across the virtual channel dimension.

The process at 1420 includes identifying or finding targets from the range-Doppler data and extracting or obtaining the frequency domain corresponding to the identified targets in the range-Doppler data from the virtual channels. As described herein, a peak selection or peak detection technique or approach can be used to identify a number of peaks or targets from the range-Doppler data. That is, local maxima of the range-Doppler data can be identified or located. Based on the peak identification, frequency domain data is obtained from the range-Doppler data that corresponds to the detected or identified peaks. This obtained frequency domain data can be the complex values from each of the virtual channels. That is, complex values across the virtual channels at the location of the identified peaks are extracted or obtained from the data cube. In some cases, the complex values may be further processed, and for example, amplitude and/or phase data may be generated or determined from the extracted complex values. In embodiments, as later explained herein, the number of targets (which may be only separated by angle) within each of identified peaks can be estimated.

The graph 1530 can represent one example of a range-Doppler bin data produced from a 2D FFT. As can be seen in the example graph 1530, four peaks or peak locations may be identified. After identifying peaks, the frequency domain data, e.g., complex values, corresponding to the identified peak locations are obtained, e.g., from the virtual channels for further use. That is, for each peak of the range-Doppler map the frequency domain data (e.g. the one dimensional vector formed by all the complex values at the peak range and Doppler value across all or each of the virtual channels) can be extracted and then used.

In exemplary embodiments of the present disclosure, machine learning modules used herein may determine the number of objects or targets in frequency domain data. The trained machine learning module can analyze the inputted frequency domain data values, e.g., complex values, phase values, and/or amplitude values. The machine learning module determines or estimates the number of targets from the range-Doppler bin data, which is outputted. The output or output values can be used in further applications radar applications, including estimating the objects' direction.

Referring back to FIG. 14, after obtaining the frequency domain data from the peak detection, a machine learning module may be employed that uses the obtained frequency domain data. Specifically, at 1430, a trained machine learning module generates outputs or outputs values designated by reference number 1440, indicating the number of targets. The one or more output values produce indicates a number or estimation of objects detected or existing in the radar reception data.

For example, in exemplary embodiments of the present disclosure, for every identified peak in the range-Doppler map, the corresponding frequency domain data (e.g., complex, phase, and/or amplitude values) is fed into the neural network. The frequency domain data from each identified peak may be inputted or fed into the machine learning module separately or individually for each identified. The machine learning module then outputs a value or values indicating a determined estimated number of targets for the respectively identified peak corresponding to input frequency domain data.

In some instances, the machine learning module may be implemented as a plurality of machine learning modules. As such, each of the plurality of machine learning modules may take a set of frequency domain data corresponding to one of the identified peaks. Thus, the multiple machine learning modules may operate in parallel.

Accordingly, the sum or total of the machine learning module's output values from each of the inputted frequency domain data (for a range-Doppler map peak) can indicate the total number of detected targets from all the peaks, e.g., for a range-Doppler map.

In various embodiments, the machine learning module can be trained using a training dataset. The dataset may include data frequency domain data and target data. The dataset may include varying frequency domain values (complex value, amplitude values, and/or phase values) and varying target number data. For example, in the dataset, the frequency domain data may correspond to different arrival angles of targets/objects, different noise levels, and power levels of radar reception data.

In various embodiments, the training dataset may be produced or generated from simulations. A simulator for MIMO radar, e.g., one or more processors executing instructions to execute MIMO radar simulations, may produce radar reception data or frequency domain data. The simulator may execute simulations with variable settings to produce radar reception or frequency domain data based on varying combinations of arrival angles of targets/objects, noise levels, and power levels of radar reception data.

In other cases, the training dataset or parts thereof may be obtained or generated through measurements of actual radar reception data. In one example, a MIMO radar test experiment may use a controlled environment, e.g., an antenna test chamber. Radar reception data may be obtained in the antenna test chamber from the MIMO radar test experiments can be performed to generate radar receive signals or radar reception data. The MIMO radar test experiments can generate radar reception data for a varying combination of certain parameters, e.g., the number of radar targets, angles of the radar targets, power levels or radar receive signals, and noise levels. The radar reception data generated through MIMO radar experiments can then be processed appropriately, e.g., using one or more computing devices, into training data for the neural network.

In short, frequency domain data produced by the simulations or real and/or from experiment/testing can then be used to train a machine learning module.

Figure 18A:
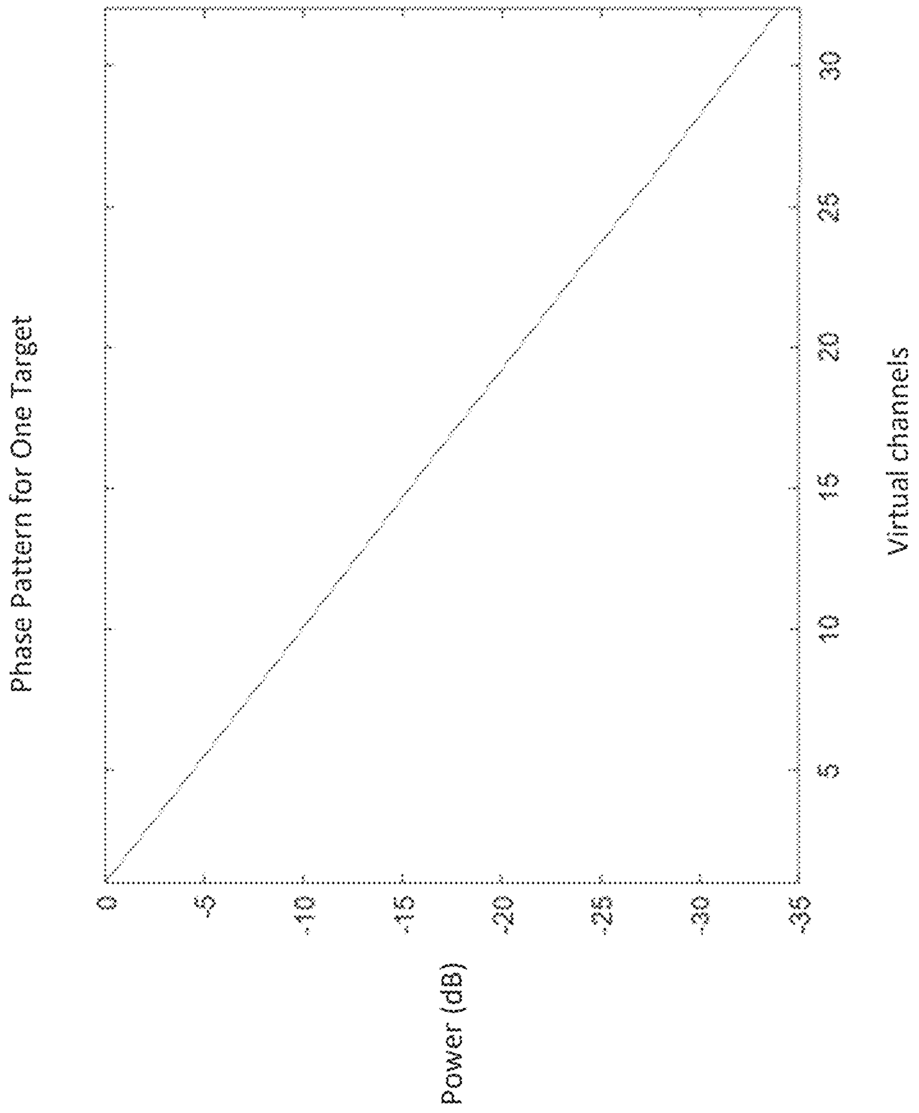
FIGS. 18A, 18B, and 18C show graphs of exemplary phase patterns.
Figure 18B:
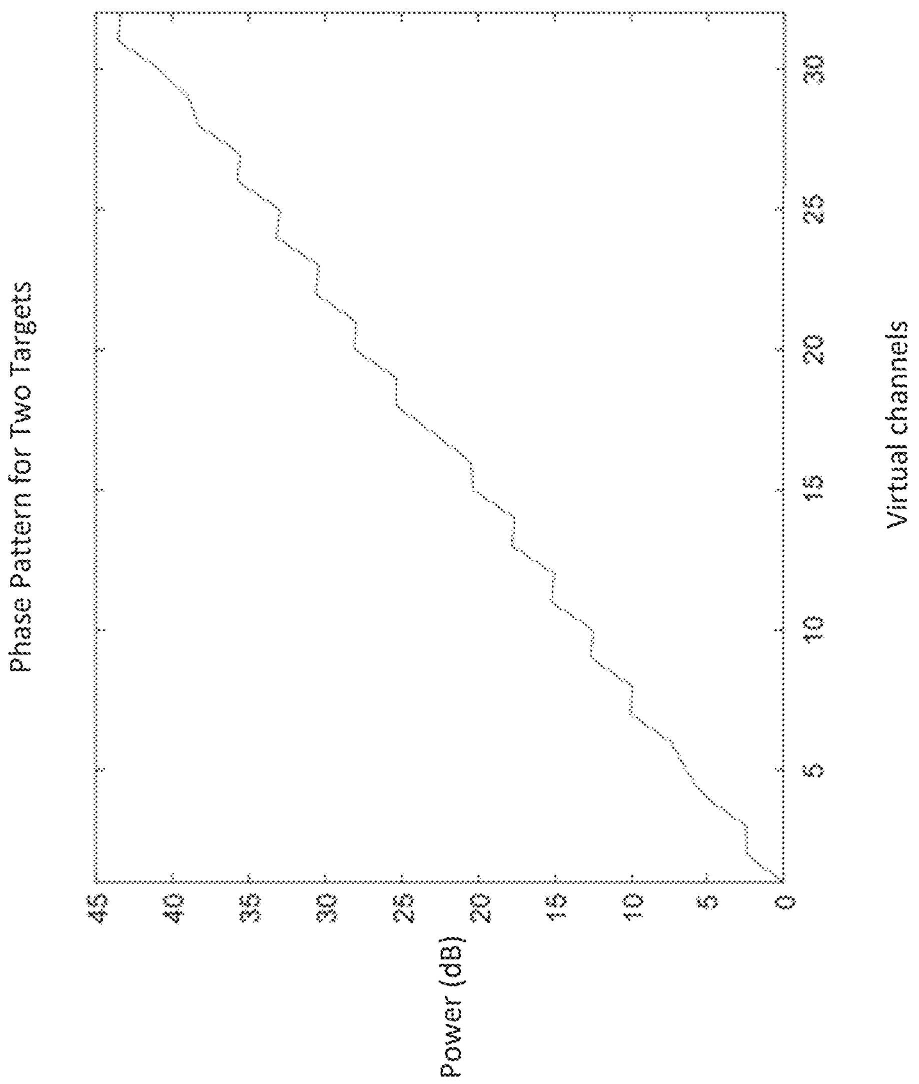
Figure 18C:
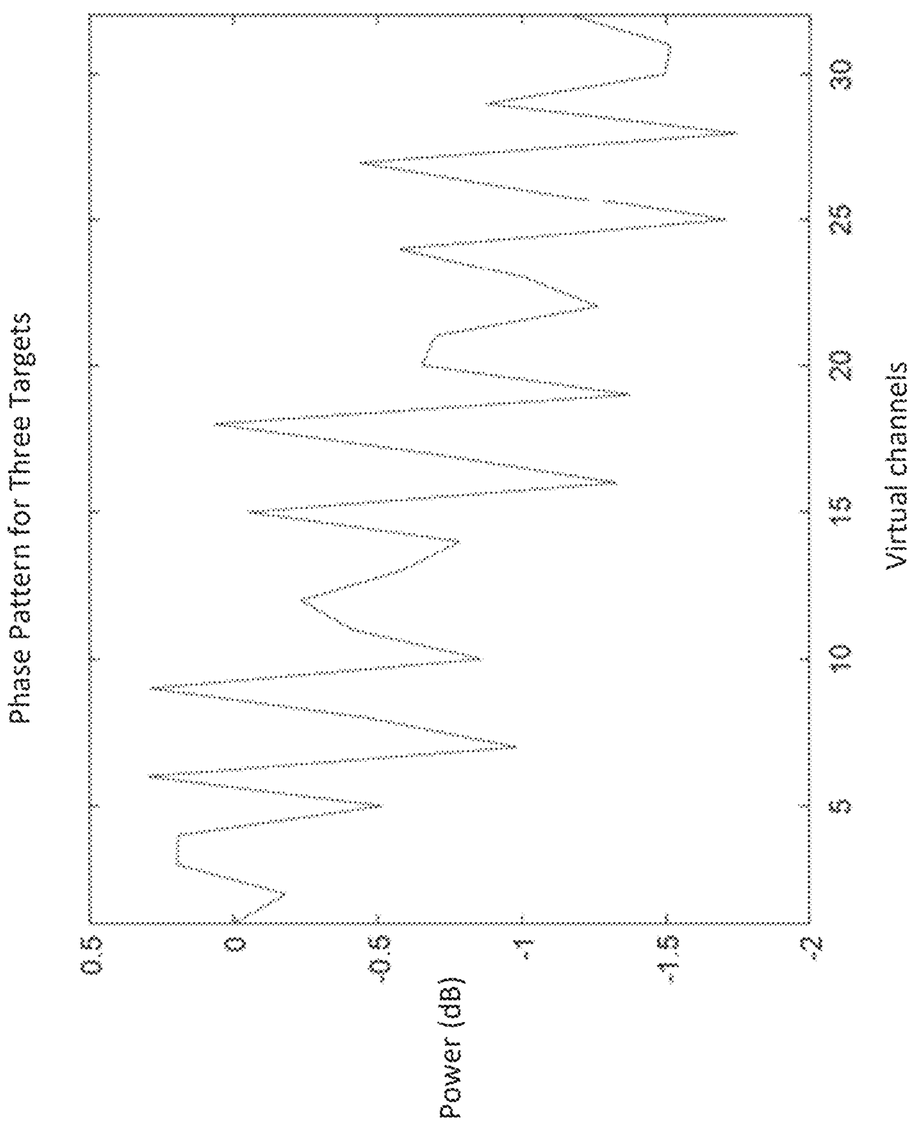

FIGS. 18A, 18B, and 18C show three graphs showing an example of phase patterns respectively for 1, 2, and 3 targets within a one range-Doppler bin for a MIMO radar arrangement having 32 virtual channels. The underlying data that produces these graphically represented phase patterns can be used as input into a machine learning module. The machine learning module produces a result or output indicating a correct or accurate number of targets or objects. The phase pattern data may be obtained from the radar reception data as explained. Further, such phase pattern data may be generated by MIMO radar simulations.

Figure 19:
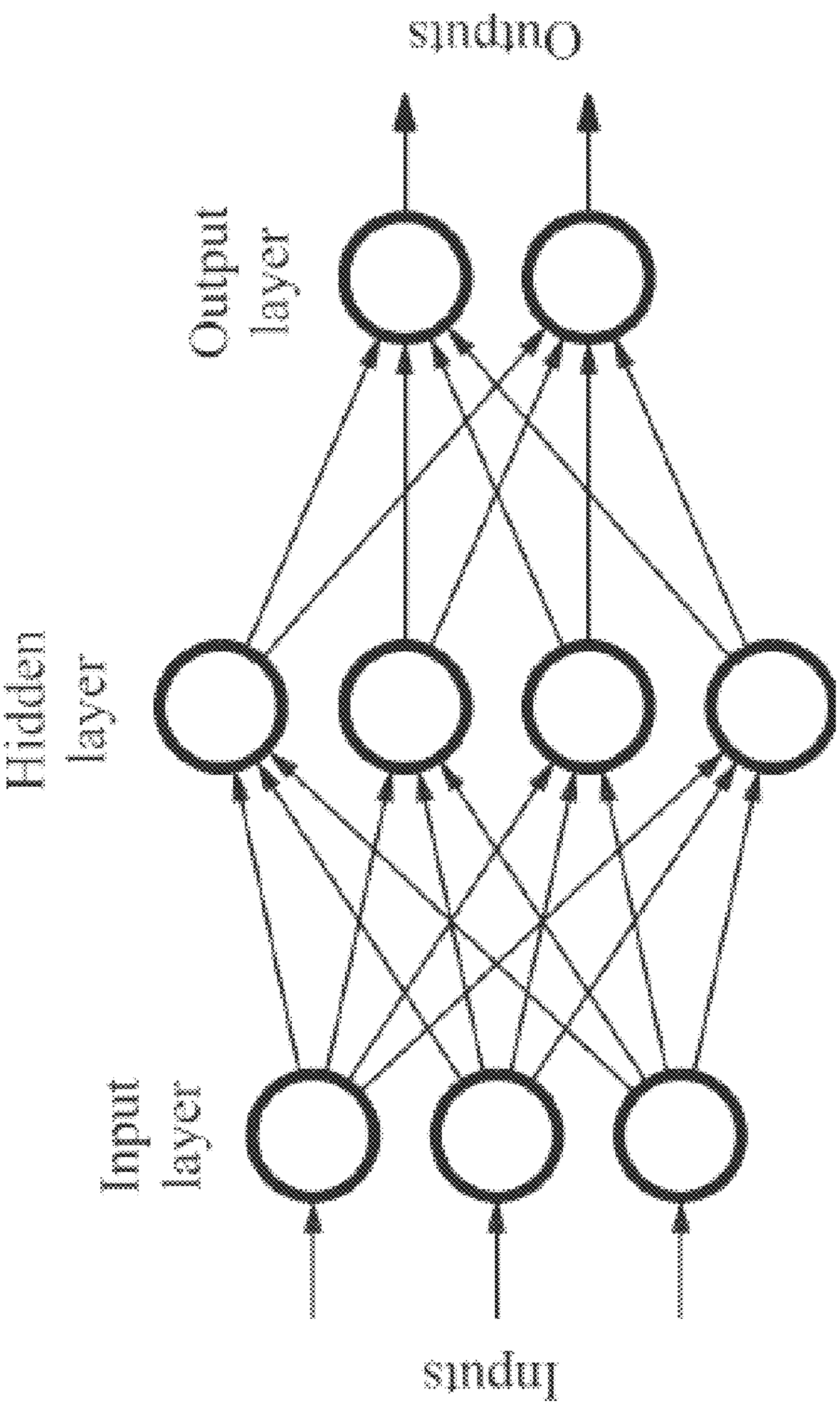
FIG. 19 shows a graphical representation of a neural network.

In various cases, a machine learning module used for object number determination be in the form of a neural network. FIG. 19 shows one exemplary representation of a neural network. A neural network can include an input layer, an output layer, and one or more hidden layers. Each layer includes one or more nodes or neurons. Each layer generates an output from or using the received input. The output from one layer may be weighted and provided to the next layer.

According to embodiments herein, a trained neural network will include an input layer that receives input values regarding the frequency domain layer and output layer to produce output values that indicate the number of targets or objects. The type of neural network implemented may be a feedforward, convolution, recurrent, auto-encoder to name a few. In the neural network the input or input vector is fed into the input layer. In turn these inputs are combined into each of the nodes of a first hidden layer with a scaling and offset factors (these factors are tuned for each connection, during the training phase of the neural network, based on the well-known backpropagation algorithm). This process occurs between all hidden layers until it is propagated to the nodes in the output layer. The nodes in the output layer produce an output value(s) indicating a number or quantity of targets.

Other machine learning modules may be used for determining a number or quantity of objects from frequency domain data. In at least one example, a trained machine learning module may include one that implements a classification algorithm to determine the number of targets or objects from input frequency domain data. Examples of classification algorithms include Decision Trees (Random Forest), Logistic Regressions, Naive Bayes Classifier, K-Nearest Neighbors, and Support Vector Machines, to name a few.

Figure 20:
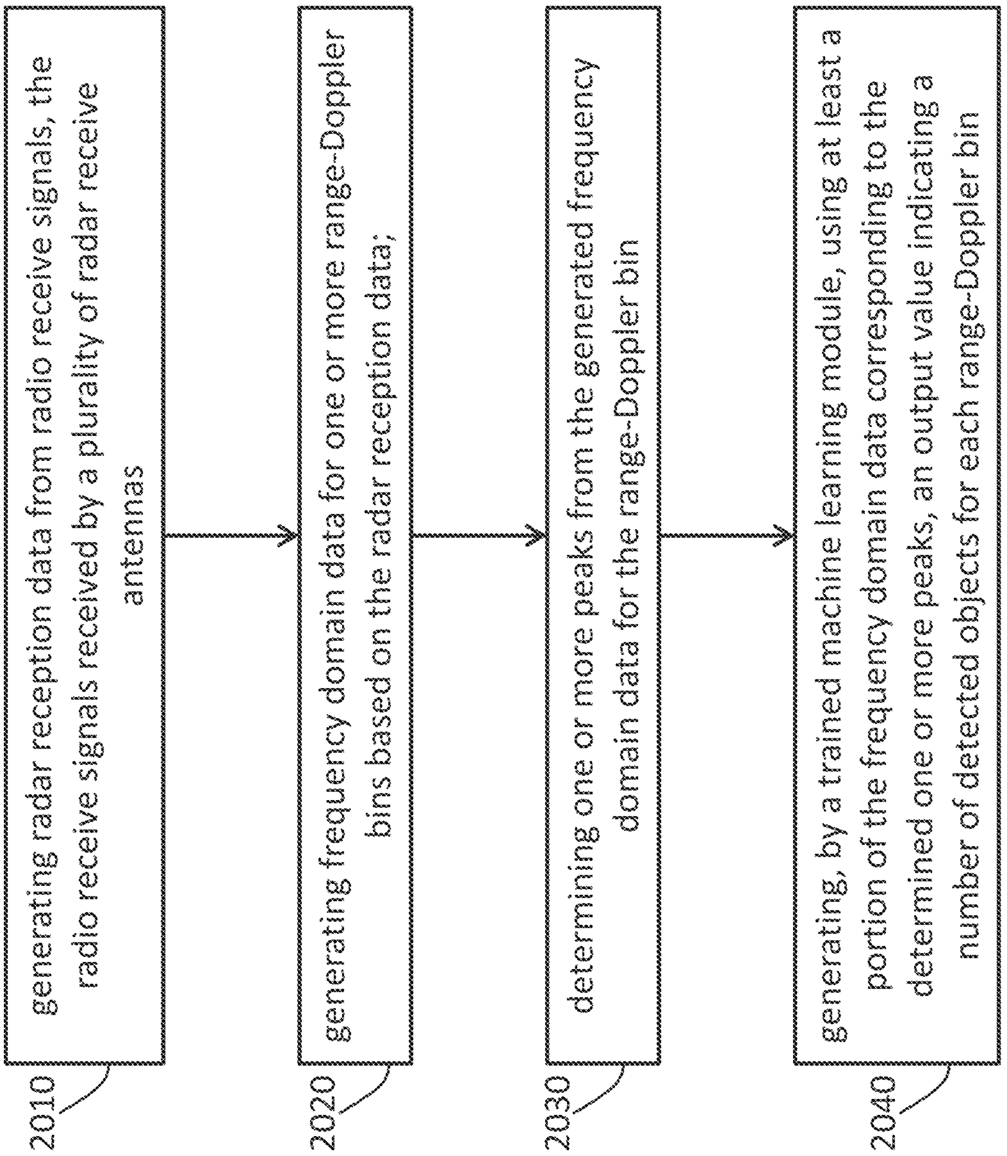
FIG. 20 shows a flow diagram illustrating a method for radar object number determination.

FIG. 20 shows a flow diagram illustrating a method for radar object number determination. This process may be performed for multiple radar for each Doppler bin The process or method includes generating radar reception data from radio receive signals, the radio receive signals received by a plurality of radar receive antennas at 2010. The method includes generating frequency domain data for one or more range-Doppler bins based on the radar reception data at 2020 and determining one or more peaks from the generated frequency domain data at 2030. At 2040 the method includes generating, by a trained machine learning module, using at least a portion of the frequency domain data corresponding to the determined one or more peaks, one or more output values indicating a number of detected objects for each range-Doppler bin. That is, the one or more output values of the machine learning module can indicate the number of detected objects (in an angular domain) for each (range-Doppler) peak.

The method or aspects thereof may be repeated or applied, e.g., for different range-Doppler bins.

In embodiments, the number of targets may be estimated in accordance with the exemplary embodiments described herein. The target number or quantity estimation method or devices described herein may be used or employed for later processing. In various examples, the estimation of the quantity of targets is performed before prior to any angle estimation algorithm, which may include the use of additional FFTs. The one or more output values from the machine learning module/neural network may be stored and/or may be further processed as input by one or more processing devices. The processing devices may implement a suitable angle estimation method of algorithm. In one case, the determined estimated number or quantity of targets can serve as an input for angle estimators, such as, for example, like Multiple Signal Classification (MUSIC) or iterative estimators. The target estimation devices and methods described herein can to save computation time for angle estimation methods which require a priori input of the number of targets.

The method of FIG. 20 may be implemented by devices and systems described herein.

The following examples pertain to further aspects of this disclosure:

Example 1 is a radar arrangement for a multiple-input multiple-output (MIMO) radar including:

1. a radar receiver configured to generate radar reception data from radio receive signals received by a plurality of radar receive antennas;
2. at least one signal processor configured to:
   i. generate frequency domain data for one or more range-Doppler bins based on the radar reception data;
   ii. determine one or more peaks from the generated frequency domain data;
3. a trained machine learning module configured to generate, using frequency domain data from each virtual channel that corresponds to each of the of the one or more determined peaks as input, one or more output values indicating a number of detected objects within each of the one or more range-Doppler bins.

Example 2 is subject matter of Example 1, wherein the at least one signal processor can be configured to generate frequency domain data for the one or more range-Doppler bins comprises the at least one signal processor to perform a two-dimensional (2D) Fast Fourier Transform (FFT) on the generated radar reception data.

Example 3 is subject matter of Example 1 or 2, wherein the frequency domain data used as input to the trained machine learning module can include complex values.

Example 4 is subject matter of Example 3, wherein the at least one signal processor can be configured to obtain the complex values from the generated frequency domain data corresponding to the one or more determined peaks from each virtual channel and provide the complex values as input to the trained machine learning module.

Example 5 is subject matter of Example 1 or 2, wherein the frequency domain data used as input to the trained machine learning module can include a phase values and/or amplitude values corresponding to each of the one or more determined peaks.

Example 6 is subject matter of Example 5, wherein the at least one signal processor can be configured to obtain the phase values and/or amplitude values from the generated frequency domain data and provide the plurality of phase values and/or amplitude values as input to the trained learning module.

Example 7 is subject matter of any of Examples 1 to 6, which can further include: a transmit array comprising a plurality of transmit antennas, the transmit antenna configured to transmit transmission radio signals; and a receiver array comprising the plurality of receive antennas, the receiver array configured to receive the receive radio signals, wherein the receive radio signals are the transmission radio signals after reflection by one or more targets.

Example 8 is subject matter of any of Examples 1 to 7, wherein the trained machine learning module can be a machine learning model trained with training data set comprising received frequency domain data corresponding for a varying number of targets located at a varying range of angles.

Example 9 is subject matter of any of Examples 1 to 8, wherein the trained machine learning module can be a trained neural network comprising at least an input layer, an output layer, and one or more hidden layers, each layer having one or more nodes.

Example 1A is a method for multiple-input multiple-output (MIMO) radar including:

1. generating radar reception data from radio receive signals, the radio receive signals received by a plurality of radar receive antennas;
2. generating frequency domain data for one or more range-Doppler bins based on the radar reception data;
3. determining one or more peaks from the generated frequency domain data for the one or more range-Doppler bins;
4. generating, by a trained machine learning module, using at least a portion of the frequency domain data from each virtual channel that corresponds to the determined one or more peaks, one or more output values indicating a number of detected objects for each of the one or more range-Doppler bins.

Example 2A is the subject matter of Example 1A, wherein generating the frequency domain data for the one or more range-Doppler bins can include performing a two-dimensional Fast Fourier Transform (2D FFT) on the generated radar reception data for each of the one or more range-Doppler bins.

Example 3A is subject matter of Example 1 or 2, wherein the frequency domain data used as input can include complex values.

Example 4A is subject matter of Example 3, which can further include obtaining the complex values from the generated frequency domain data corresponding to each of the one or more determined peaks from each virtual channel and providing the complex values as input to the trained machine learning module.

Example 5A is subject matter of Example 3A, wherein the frequency domain data used as input to the trained machine learning module can include a plurality of phase values and/or amplitude values corresponding to each of the one or more determined peaks.

Example 6A is subject matter of Example 5A, which can further include obtaining the plurality of phase values and/or amplitude values from the generated frequency domain data corresponding to the one or more determined peaks and providing the plurality of phase values and/or amplitude values as input to the trained learning module.

Example 7A is subject matter of any of Examples 1A to 6A, which can further include: transmitting transmission radio signals through a plurality of transmit antennas; and receiving the receive radio signals from a receiver array comprising the plurality of receive antennas, wherein the receive radio signals are the transmission radio signals after reflection by one or more targets.

Example 8A is subject matter of any of Examples 1A to 7A, wherein the trained machine learning module can be a machine learning model trained with training data set comprising received frequency domain data corresponding for a varying number of targets located at a varying range of angles.

Example 9A is subject matter of Examples 1A to 8A, wherein trained machine learning module is a trained neural network comprising at least an input layer, an output layer, and one or more hidden layers, each layer having one or more nodes.

Example 10A is subject matter of any of Examples 1A to 8A, wherein the machine learning module comprises executing a classification algorithm.

Example 1B is a computer implemented method for training a machine learning module for the estimating a quantity of targets in radar signals, the method including:

1. obtaining a dataset including a number of targets and corresponding frequency domain data, the frequency domain data based on radar reception data from a range of quantity of radar targets, a range of angles of the radar targets, a range of power levels, and a range of noise levels in the radar reception data; and
2. training a machine learning module using the generated dataset to generate one or more output values providing an estimation of a number of targets from input frequency domain data.

Example 2B is subject matter of Example 1B, which can further include generating the dataset including the frequency domain data, wherein generating the dataset includes: generating the radar reception for the range of quantity of radar targets, the range of angles of the radar targets, a range of power levels, and for a range of noise levels; and generating the dataset including the frequency domain data from the generated radar reception data.

Example 3B is the subject matter of Example 2B, wherein generating the radar reception data can include executing one or more simulations of a multiple-input multiple-output (MIMO) radar system having a plurality of transmit antennas and a plurality of receive antennas, the one or more simulations incorporating the range of quantity of radar targets, the range of the angles of the radar targets, a range of power levels, and the range of the noise levels.

Example 4B is the subject matter of Example 2B or 3B, wherein the generated frequency domain data can include complex values Example 5B is the subject matter of Example 2B or 3B, wherein the generated frequency domain data can include phase values and/or amplitude values.

Example 6B is the subject matter of any of Examples 1B to 5B, wherein the machine learning module can a neural network including an input layer, an output layer, and one or more hidden layers, each layer comprising one or more nodes.

Example 7B is the subject matter of any of Examples 1B to 5B, wherein the machine learning module comprises executing a classification algorithm.

Example 1C is a non-transitory computer-readable storage medium containing instructions that when executed one or more processors cause the processor to perform the functions or methods of any of Examples 1B to 7B.

The scope of the disclosure is thus indicated by the appended claims and all changes which come within the meaning and range of equivalency of the claims are therefore intended to be embraced.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

What is claimed is:

1. A radar arrangement for estimating a direction of arrival of radar signals from one or more objects in a scene using a multiple-input multiple-output (MIMO) radar comprising:

a radar receiver comprising:

a plurality of radar receive antennas; and a plurality of mixers having respective inputs coupled to respective outputs of the plurality of radar receive antennas, respectively;

wherein the radar receiver is configured to generate radar reception data from radio receive signals received by the plurality of radar receive antennas;

at least one signal processor coupled to the plurality of mixers, the at least one signal processor configured to:

generate a data cube including frequency domain data for one or more range-Doppler bins based on the radar reception data; and determine one or more peaks from the generated frequency domain data, wherein the one or more peaks corresponds to one or more virtual channels; and a trained machine learning module configured to generate, using only the frequency domain data from each virtual channel that corresponds to each of the one or more determined peaks as input and not using other data in the data cube, one or more output values indicating a number of detected objects in the scene; and wherein the signal processor is configured to estimate an angle of arrival of each of the objects in the scene using the number of detected objects and the frequency domain data, whereby not using the other data in the data cube enhances processing speed for the radar arrangement.

2. The radar arrangement of claim 1, wherein the signal processor is configured to estimate the angle of arrival of each of the objects in the scene using a subspace-based algorithm.

3. The radar arrangement of claim 1, wherein the at least one signal processor is further configured to perform a two-dimensional (2D) Fast Fourier Transform (FFT) on the generated radar reception data.

4. The radar arrangement of claim 1, wherein the frequency domain data used as input to the trained machine learning module comprises complex values.

5. The radar arrangement of claim 1, wherein the frequency domain data used as input to the trained machine learning module comprises a plurality of phase values corresponding to each of the one or more determined peaks.

6. The radar arrangement of claim 1, further comprising:

a transmit array comprising a plurality of transmit antennas, the transmit antenna configured to transmit transmission radio signals; and a receiver array comprising a plurality of receive antennas, the receiver array configured to receive the radio receive signals, wherein the receive radio signals are the transmission radio signals after reflection by one or more objects.

7. The radar arrangement of claim 6 wherein there are at least 50 virtual channels each defined by a particular combination of transmit and receive antennas.

8. The radar arrangement of claim 1, wherein the trained machine learning module is a machine learning model trained with a training data set comprising received frequency domain data corresponding to a varying number of objects located at a varying range of angles.

9. The radar arrangement of claim 1, wherein the trained machine learning module is a trained neural network comprising at least an input layer, an output layer, and one or more hidden layers, each layer having one or more nodes.

10. The radar arrangement of claim 1, wherein the trained machine learning module is configured to execute a classification algorithm.

11. A method for multiple-input multiple-output (MIMO) radar comprising:

generating radar reception data using a plurality of radar receive antennas wherein the plurality of radar receive antennas are configured to receive radio receive signals from one or more objects in a scene;

using a plurality of mixers having respective inputs coupled to respective outputs of the plurality of radar receive antennas, respectively, to generate a data cube including frequency domain data for one or more range-Doppler bins based on the radar reception data;

determining one or more peaks from the generated frequency domain data for each of the range-Doppler bins, wherein the one or more peaks corresponds to one or more virtual channels;

generating, by a trained machine learning module, using the frequency domain data from each virtual channel that corresponds to the determined one or more peaks as an input and not using other data in the data cube, one or more output values indicating a number of detected objects in the scene; and estimating an angle of arrival of each of the objects in the scene using the number of detected objects and the frequency domain data, whereby not using the other data in the data cube enhances processing speed of the MIMO radar.

12. The method of claim 11, wherein estimating of the angle of arrival of each of the objects in the scene uses a subspace-based algorithm.

13. The method of claim 11, wherein generating the frequency domain data for a range bin comprises performing a two-dimensional Fast Fourier Transform (FFT) on the generated radar reception data for each of the range-Doppler bins.

14. The method of claim 11, wherein the frequency domain data used as input to the trained machine learning module comprises complex values.

15. The method of claim 11, wherein the frequency domain data used as input to the trained machine learning module comprises a plurality of phase values corresponding to each of the one or more determined peaks.

16. The method of claim 11, further comprising:

transmitting transmission radio signals through a plurality of transmit antennas; and receiving the radio receive from a receiver array comprising a plurality of receive antennas, wherein the radio receive signals are the transmission radio signals after reflection by one or more targets.

17. The method of claim 16 wherein there are at least 50 virtual channels each defined by a particular combination of transmit and receive antennas.

* * * * *